(12) United States Patent
Kim et al.

(10) Patent No.: US 9,596,453 B2
(45) Date of Patent: Mar. 14, 2017

(54) ELECTRONIC DEVICE AND CONTROL METHOD THEREOF

(75) Inventors: Kilseon Kim, Seoul (KR); Sungyong Hong, Seoul (KR)

(73) Assignee: LG ELECTRONICS INC., Seoul (KR)

(*) Notice: Subject to any disclaimer, the term of this patent is extended or adjusted under 35 U.S.C. 154(b) by 493 days.

(21) Appl. No.: 13/118,331

(22) Filed: May 27, 2011

(65) Prior Publication Data

US 2011/0304697 A1    Dec. 15, 2011

(30) Foreign Application Priority Data

Jun. 14, 2010 (KR) .................. 10-2010-0055943
Aug. 13, 2010 (KR) .................. 10-2010-0078412

(51) Int. Cl.
*H04N 13/02* (2006.01)
*H04N 5/232* (2006.01)
*H04N 13/00* (2006.01)
*H04N 13/04* (2006.01)

(52) U.S. Cl.
CPC ..... *H04N 13/0239* (2013.01); *H04N 5/23293* (2013.01); *H04N 13/0014* (2013.01); *H04N 13/0051* (2013.01); *H04N 13/0402* (2013.01)

(58) Field of Classification Search
CPC .......... H04N 13/0022; H04N 13/0014; H04N 13/0051; H04N 13/0239; H04N 13/0402; H04N 5/23293; G06F 3/0488; G06F 3/04847; G06F 2203/04806
USPC ......... 348/47, 51, 207.99, E13.074; 382/154
See application file for complete search history.

(56) References Cited

U.S. PATENT DOCUMENTS

| | | | | |
|---|---|---|---|---|
| 5,786,847 A | * | 7/1998 | Katayama | .......... H04N 13/0022 348/47 |
| 6,549,650 B1 | * | 4/2003 | Ishikawa | ............ G02B 27/2264 345/419 |
| 6,686,926 B1 | * | 2/2004 | Kaye | ...................... G03B 35/16 345/680 |

(Continued)

FOREIGN PATENT DOCUMENTS

| | | |
|---|---|---|
| CN | 1665313 | 9/2005 |
| CN | 1912736 | 2/2007 |

(Continued)

OTHER PUBLICATIONS

The State Intellectual Property Office of the People's Republic of China Application Serial No. 201110156750.4, Office Action dated Sep. 10, 2013, 6 pages.

(Continued)

*Primary Examiner* — Christopher S Kelley
*Assistant Examiner* — Deirdre Beasley
(74) *Attorney, Agent, or Firm* — Lee, Hong, Degerman, Kang & Waimey

(57) ABSTRACT

An electronic device and a method of controlling the electronic device are provided. The electronic device varies a depth of a stereoscopic image displayed on a display unit of the electronic device based on a specific object selected from a preview image displayed on the display unit. When a zoom condition of a camera module of the electronic device is changed, the electronic device adjusts a depth of the stereoscopic image based on the changed zoom condition.

10 Claims, 25 Drawing Sheets

(56) References Cited

U.S. PATENT DOCUMENTS

| | | | |
|---|---|---|---|
| 7,371,163 B1* | 5/2008 | Best | A63F 13/10 463/1 |
| 7,466,336 B2* | 12/2008 | Regan et al. | 348/50 |
| 7,646,540 B2* | 1/2010 | Dolgoff | 359/630 |
| 7,825,996 B2* | 11/2010 | Yamada et al. | 348/744 |
| 8,213,711 B2* | 7/2012 | Tam et al. | 382/162 |
| 8,284,294 B2* | 10/2012 | Kohama | H04N 5/2258 348/262 |
| 2002/0008906 A1 | 1/2002 | Tomita | |
| 2002/0126396 A1* | 9/2002 | Dolgoff | G02B 27/2278 359/743 |
| 2003/0128242 A1* | 7/2003 | Gordon | G06F 3/04815 715/848 |
| 2004/0046885 A1* | 3/2004 | Regan | H04N 5/23293 348/333.11 |
| 2004/0189796 A1* | 9/2004 | Ho | H04N 13/026 348/51 |
| 2005/0099414 A1* | 5/2005 | Kaye | G06T 19/00 345/419 |
| 2006/0087556 A1* | 4/2006 | Era | H04N 13/026 348/51 |
| 2006/0197832 A1* | 9/2006 | Yamada | G02B 27/017 348/77 |
| 2007/0113198 A1* | 5/2007 | Robertson | G06F 3/0481 715/790 |
| 2008/0131107 A1* | 6/2008 | Ueno | G03B 17/00 396/50 |
| 2008/0158346 A1* | 7/2008 | Okamoto | H04N 5/23238 348/47 |
| 2008/0158384 A1* | 7/2008 | Okamoto | H04N 5/232 348/231.2 |
| 2008/0316300 A1* | 12/2008 | Okamoto | H04N 5/2258 348/47 |
| 2009/0015703 A1* | 1/2009 | Kim | G03B 29/00 348/333.12 |
| 2009/0123144 A1* | 5/2009 | Maezono | G03B 35/00 396/327 |
| 2009/0219283 A1* | 9/2009 | Hendrickson | H04N 13/0022 345/420 |
| 2009/0237494 A1* | 9/2009 | Oota | G03B 35/08 348/51 |
| 2009/0262184 A1* | 10/2009 | Engle | G06T 19/00 348/47 |
| 2009/0315981 A1* | 12/2009 | Jung | H04N 13/026 348/43 |
| 2010/0080448 A1* | 4/2010 | Tam | G06T 7/0051 382/154 |
| 2010/0171837 A1* | 7/2010 | Pillman | G06T 7/2013 348/187 |
| 2010/0260398 A1* | 10/2010 | Ma | A61B 6/469 382/131 |
| 2011/0018976 A1* | 1/2011 | Park | H04N 13/0018 348/51 |
| 2011/0074784 A1* | 3/2011 | Turner | H04N 13/026 345/427 |
| 2011/0134109 A1* | 6/2011 | Izumi | H04N 13/026 345/419 |
| 2011/0157155 A1* | 6/2011 | Turner | G06T 19/00 345/419 |
| 2011/0158504 A1* | 6/2011 | Turner | H04N 13/026 382/154 |
| 2011/0283213 A1* | 11/2011 | Leebow | G06F 3/04815 715/769 |
| 2012/0069143 A1* | 3/2012 | Chu | H04N 13/0022 348/43 |

FOREIGN PATENT DOCUMENTS

| | | | |
|---|---|---|---|
| CN | 101729918 | 6/2010 | |
| EP | 1617684 | 1/2006 | |
| EP | 2395760 A2 * | 12/2011 | |
| JP | 2003018617 A | 1/2003 | |
| JP | 3653790 | 3/2005 | |
| JP | 2010-068182 | 3/2010 | |
| JP | 2010068182 | 3/2010 | |
| JP | EP 2395760 A2 * | 12/2011 | G06F 3/04815 |
| KR | 20070101826 | 10/2007 | |
| KR | 20090084633 A | 8/2009 | |
| WO | 2005/055617 | 6/2005 | |
| WO | 2010/035413 | 4/2010 | |

OTHER PUBLICATIONS

European Patent Office Application Serial No. 11004455.9, Search Report dated Mar. 12, 2014, 9 pages.

Korean Intellectual Property Office Application Serial No. 10-2010-0078412, Office Action dated Feb. 29, 2016, 8 pages.

* cited by examiner

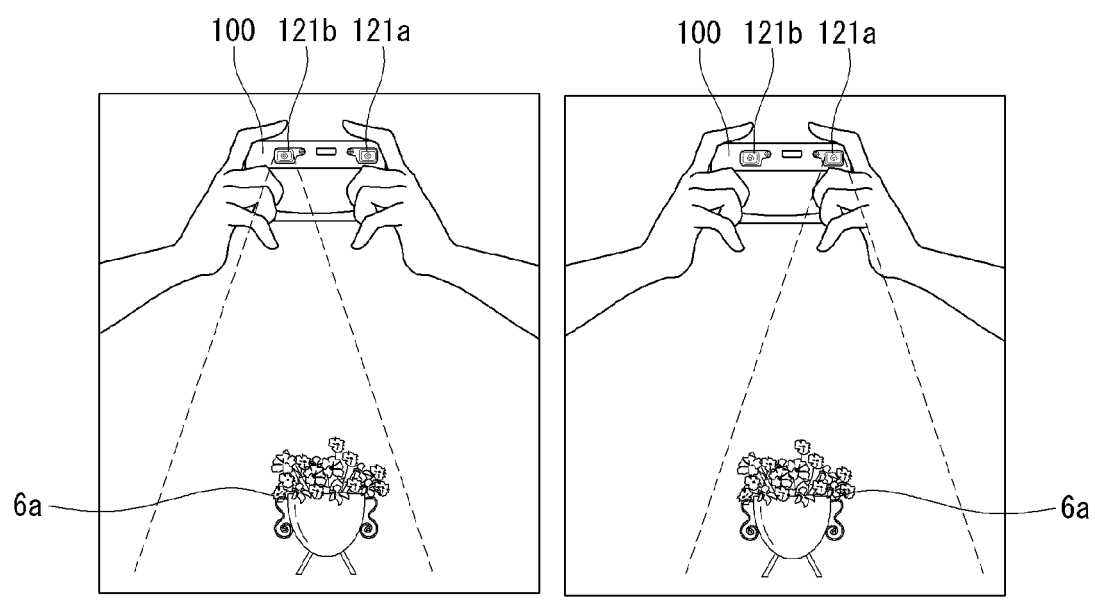
FIG. 6A  FIG. 6B

ELECTRONIC DEVICE AND CONTROL METHOD THEREOF

CROSS-REFERENCE TO RELATED APPLICATIONS

Pursuant to 35 U.S.C. §119 (a), this application claims the benefit of earlier filing date and right of priority to Korean Patent Application Nos. 10-2010-0055943 filed on Jun. 14, 2010, and 10-2010-0078412 filed on Aug. 13, 2010, the contents of which are hereby incorporated by reference in their entirety.

FIELD OF THE INVENTION

The present disclosure relates to an electronic device and a control method thereof.

DESCRIPTION OF THE RELATED ART

Due to recent trends to add functions for 3D effects in electronic devices, improvements to hardware and software of the electronic devices are necessary.

SUMMARY OF THE INVENTION

Exemplary embodiments of the present invention provide an electronic device and a method of controlling the electronic device that may enhance user convenience while generating a stereoscopic image or varying a depth of the stereoscopic image.

According to an aspect of the invention, there is provided an electronic device, including a display unit configured to display images, at least a first camera module and a second camera module, wherein each of the first camera module and the second camera module is configured to acquire an image, and a controller. The controller is configured to synthesize a first image acquired from the first camera module and a second image acquired from the second camera module to generate a stereoscopic image, control the display unit to display the stereoscopic image, control the display unit to display a third image including at least the first image or the second image, receive a selection of a specific object of at least one object of the third image, and control the display unit to control a depth of the displayed stereoscopic image based on the selected specific object.

According to another aspect of the invention, there is provided an electronic device, including a plurality of camera modules including at least a first camera module and a second camera module, wherein each of the first camera module and the second camera module is configured to acquire an image, and a controller. The controller is configured to synthesize a first image acquired from the first camera module and a second image acquired from the second camera module to generate a stereoscopic image, and control a depth of the stereoscopic image based on a zoom condition of the plurality of camera modules.

According to another aspect of the invention, there is provided an electronic device, including a touch screen configured to display images and receive touch inputs, at least a first camera module and a second camera module, wherein each of the first camera module and the second camera module is configured to acquire an image, and a controller. The controller is configured to synthesize a first image acquired from the first camera module and a second image acquired from the second camera module to generate a stereoscopic image, control the touch screen to display the stereoscopic image, and control the touch screen to control a depth of the displayed stereoscopic image based on a change in a distance between a plurality of positions of touch inputs received via the touch screen.

According to another aspect of the invention, there is provided an electronic device, including a touch screen configured to display images and receive touch inputs, a plurality of camera modules including at least a first camera module and a second camera module, wherein each of the first camera module and the second camera module is configured to acquire an image, and a controller. The controller is configured to synthesize a first image acquired from the first camera module and a second image acquired from the second camera module to generate a stereoscopic image, control the touch screen to display a scroll object, and control a depth of the stereoscopic image by adjusting a convergence point of the first image and the second image based on a position of the scroll object.

According to another aspect of the invention, there is provided an electronic device, including a display unit configured to display images, at least a first camera module and a second camera module, wherein each of the first camera module and the second camera module is configured to acquire an image, and a controller. The controller is configured to synthesize a first image acquired from the first camera module and a second image acquired from the second camera module to generate a stereoscopic image, control the display unit to display the stereoscopic image, control the display unit to display a third image comprising at least the first image or the second image, receive a selection of a specific object of at least one object of the third image, receive input of a movement of the selected specific object, and control the display unit to control a depth of the displayed stereoscopic image based on the movement of the selected specific object.

According to another aspect of the invention, there is provided a method of controlling an electronic device including a plurality of camera modules. The method includes synthesizing, via a controller, a first image acquired from a first of the plurality of camera modules and a second image acquired from a second of the plurality of camera modules to generate a stereoscopic image, controlling a display unit, via the controller, to display the stereoscopic image and to display a third image comprising at least the first image or the second image, receiving, via the controller, a selection of a specific object of at least one object of the third image, and controlling the display unit, via the controller, to control a depth of the displayed stereoscopic image based on the selected specific object.

According to another aspect of the invention, there is provided a method of controlling an electronic device including a plurality of camera modules. The method includes synthesizing, via a controller, a first image acquired from a first of the plurality of camera modules and a second image acquired from a second of the plurality of camera modules to generate a stereoscopic image, and controlling a depth of the stereoscopic image, via the controller, based on a zoom condition of the plurality of camera modules.

According to another aspect of the invention, there is provided a method of controlling an electronic device including a plurality of camera modules. The method includes synthesizing, via a controller, a first image acquired from a first of the plurality of camera modules and a second image acquired from a second of the plurality of camera modules to generate a stereoscopic image, controlling a display unit, via the controller, to display the stereoscopic image, receiving a selection, via the controller, of a specific object of at least one object of the stereoscopic image, receiving input, via the controller, of a movement of the specific object, and controlling the display unit, via the controller, to control a depth of the displayed stereoscopic image based on the movement of the selected specific object.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

FIGS. 6A and 6B are views illustrating an example of capturing a plurality of images to generate a stereoscopic image based on the binocular parallax by using a plurality of camera modules provided in an electronic device according to an embodiment of the present invention.

DETAILED DESCRIPTION

The present invention will now be described more fully with reference to the accompanying drawings, in which exemplary embodiments of the invention are shown. The invention may, however, be embodied in many different forms and should not be construed as being limited to the embodiments set forth herein; rather, there embodiments are provided so that this disclosure will be thorough and complete, and will fully convey the concept of the invention to those skilled in the art.

In the following description, suffixes "module" and "unit" are given to components of the electronic device in consideration of only facilitation of description and do not have meanings or functions discriminated from each other.

The electronic device described in the specification may include a smart phone, laptop computer, a digital broadcasting terminal, a personal digital assistant (PDA), a portable multimedia player (PMP), a digital TV, a desktop computer, a set-top box, a digital camera, and a navigation system, for example.

Figure 1:
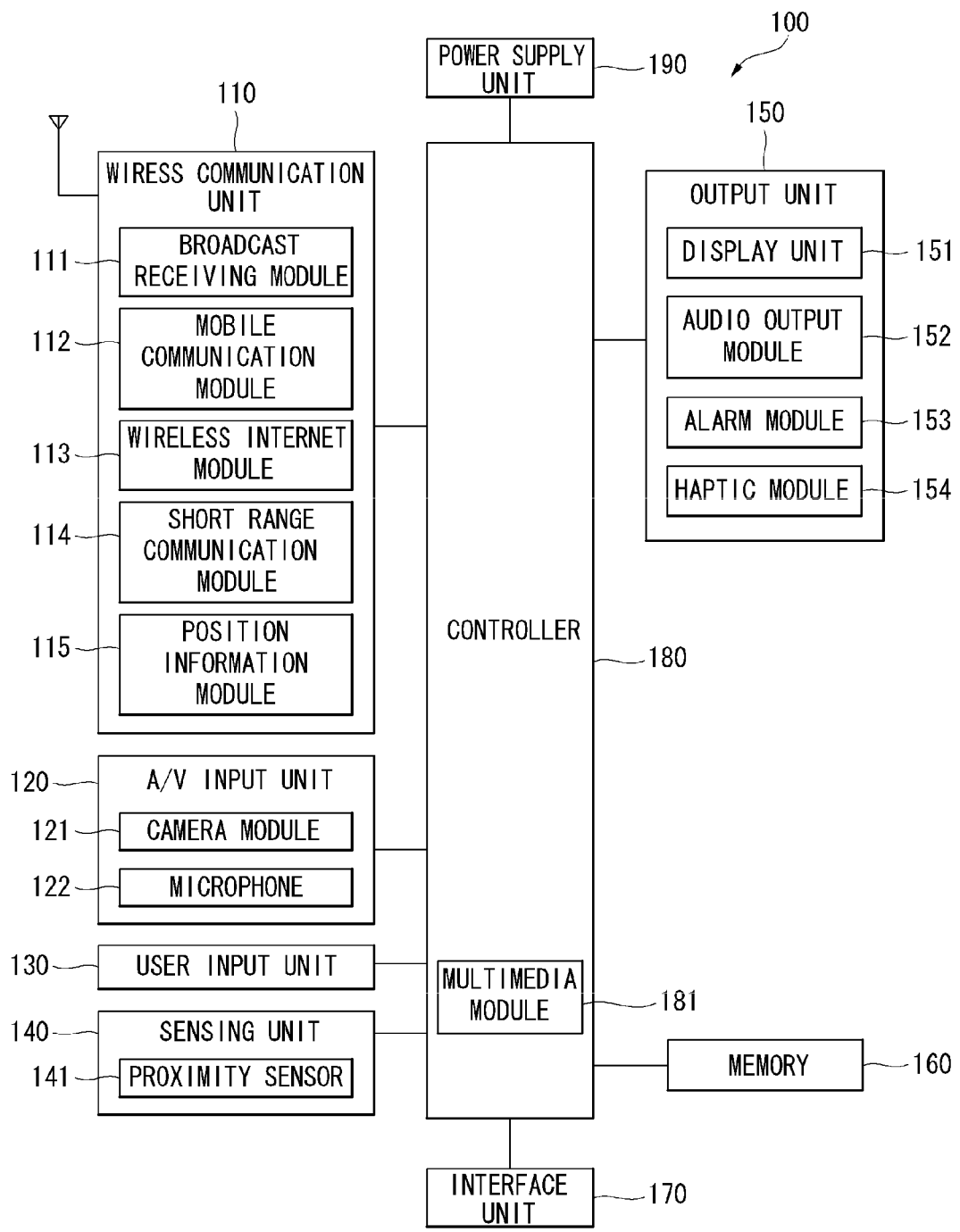
FIG. 1 illustrates a block diagram of an electronic device according to an embodiment of the present invention.

FIG. 1 is a block diagram of an electronic device 100 according to an embodiment of the present invention. Other embodiments, configurations and arrangements may also be provided. As shown, the electronic device 100 may include a wireless communication unit 110, an audio/video (A/V) input unit 120, a user input unit 130, a sensing unit 140, an output unit 150, a memory 160, an interface unit 170, a controller 180, and a power supply unit 190. Although FIG. 1 shows the electronic device 100 having various components, it is understood that implementing all of the illustrated components is not a requirement. More or fewer components may alternatively be implemented.

The wireless communication unit 110 includes one or more components that permit wireless communication between the electronic device 100 and a wireless communication system or a network within which the electronic device 100 is located. For example, the wireless communication unit 110 includes a broadcast receiving module 111, a mobile communication module 112, a wireless Internet module 113, a short-range communication module 114 and a position information module 115. For non-electronic devices, the wireless communication unit 110 may be replaced with a wired communication unit. The wireless communication unit 110 and the wired communication unit may be commonly referred to as a communication unit.

The broadcast receiving module 111 receives a broadcast signal and/or broadcast associated information from an external broadcast managing entity via a broadcast channel. The broadcast channel may include a satellite channel and/or a terrestrial channel.

The broadcast managing entity may refer to a system that transmits a broadcast signal and/or broadcast associated information. The broadcast managing entity may be a server that generates and transmits broadcast signals and/or broadcast associated information or a server for receiving previously generated broadcast signals and/or broadcast-related information and transmitting the broadcast signals and/or the broadcast associated information to the electronic device 100. The broadcast signals may include not only TV broadcast signals, radio broadcast signals, and data broadcast signals, but also signals in the form of a TV broadcast signal combined with a radio broadcast signal.

The broadcast associated information may be information about a broadcast channel, a broadcast program, or a broadcast service provider. The broadcast associated information may even be provided over a mobile communication network. In the latter case, the broadcast associated information may be received via the mobile communication module 112. Examples of broadcast associated information include an electronic program guide (EPG) of digital multimedia broadcasting (DMB) and an electronic service guide (ESG) of digital video broadcast-handheld (DVB-H).

The broadcast receiving module 111 may receive broadcast signals transmitted from various types of broadcast systems. As a non-limiting example, the broadcast systems include digital multimedia broadcasting-terrestrial (DMB-T), digital multimedia broadcasting-satellite (DMB-S), digital video broadcast-handheld (DVB-H), a data broadcasting system known as media forward link only (MediaFLO®) and integrated services digital broadcast-terrestrial (ISDB-T). The broadcast receiving module 111 may also receive multicast signals. The broadcast signals and/or the broadcast associated information received by the broadcast receiving module 111 may be stored in a suitable storage device, such as in the memory 160.

The mobile communication module 112 transmits/receives wireless signals to/from at least one of a base station, an external terminal or a server over a mobile communication network. The wireless signals may represent, for example, voice call signals, video telephony call signals or data in various forms according to the transmission/reception of text and/or multimedia messages.

The wireless Internet module 113 supports Internet access for the electronic device 100. This wireless Internet module 113 may be internally or externally coupled to the electronic device 100. Suitable technologies for wireless Internet include, but are not limited to, WLAN (Wireless LAN), Wi-Fi®, Wibro® (Wireless broadband), Wimax® (World Interoperability for Microwave Access), and HSDPA (High Speed Downlink Packet Access). The wireless Internet module 113 may be replaced with a wired Internet module in non-electronic devices. The wireless Internet module 113 and the wired Internet module may be commonly referred to as an Internet module.

The short-range communication module 114 facilitates relatively short-range communications. Suitable technologies for short-range communication include, but are not limited to, radio frequency identification (RFID), infrared data association (IrDA), ultra-wideband (UWB), as well as networking technologies such as Bluetooth® and ZigBee®.

The position information module 115 identifies or otherwise obtains a location of the electronic device 100. The position information module 115 may obtain position information by using a global navigation satellite system (GNSS). The GNSS is a term used to describe radio navigation satellite systems configured to send reference signals capable of determining their positions on the surface of the earth or near the surface of the earth while revolving around the earth. The GNSS includes: a global position system (GPS) operated by the U.S.A.; Galileo, operated by Europe; a global orbiting navigational satellite system (GLONASS) operated by Russia; COMPASS, operated by China; and a quasi-zenith satellite system (QZSS) operated by Japan.

As a typical example of the GNSS, the position information module 115 is a GPS module. The position information module 115 may calculate information related to distances between one point or object and at least three satellites and information related to the time when the distance information was measured and apply trigonometry to the obtained distance information to obtain three-dimensional position information on the point or object according to the latitude, longitude, and altitude at a predetermined time. Furthermore, a method of calculating position and time information using three satellites and correcting the calculated position and time information using another satellite may also used. The position information module 115 continues to calculate a current position in real time and to calculate velocity information based on the position information.

With continued reference to FIG. 1, the audio/video (A/V) input unit 120 may be configured to provide audio or video signal input to the electronic device 100. The A/V input unit 120 may include a camera module 121 and a microphone 122. The camera module 121 processes image frames of still pictures or video obtained by an image sensor in a photographing mode or a video telephony mode. The processed image frames may be displayed on a display unit 151.

The image frames processed by the camera module 121 may be stored in the memory 160 or transmitted to an external device through the wireless communication unit 110. Optionally, the electronic device 100 can include two or more camera modules 121, if appropriate.

The microphone 122 receives an external audio signal while the electronic device 100 is in a particular mode, such as a phone call mode, a recording mode and/or a voice recognition mode. The received audio signal is processed and converted into digital data. In the call mode, the processed digital data is transformed into a format transmittable to a mobile communication base station via the mobile communication module 112 and then output. Furthermore, the electronic device 100, and in particular the A/V input unit 120, may include a noise removing algorithm to remove noise generated in the course of receiving the external audio signal.

The user input unit 130 generates input data in response to user manipulation of an associated input device or devices. Examples of such devices include a keypad, a dome switch, a touchpad (e.g., static pressure/capacitance), a jog wheel and a jog switch. A specific example of the user input unit 130 is a touch screen in which a touchpad is combined with a display, as will be described below.

The sensing unit 140 provides status measurements of various aspects of the electronic device 100. For example, the sensing unit 140 may detect an open/closed status of the electronic device 100, relative positioning of components (e.g., a display and a keypad) of the electronic device 100, a change of position of the electronic device 100 or a component of the electronic device 100, a presence or absence of user contact with the electronic device 100, an orientation of the electronic device 100 and/or acceleration/deceleration of the electronic device 100.

As an example, the electronic device 100 may be configured as a slide-type electronic device in which the sensing unit 140 may sense whether a sliding portion of the electronic device 100 is open or closed. The sensing unit 140 may also sense presence or absence of power provided by the power supply unit 190 or the presence or absence of a coupling or other connection between the interface unit 170 and an external device.

The output unit 150 generates output relevant to the senses of sight, hearing and touch. The output unit 150 may include a display unit 151, an audio output module 152, an alarm module 153, and a haptic module 154.

The display unit 151 displays information processed by the electronic device 100. For example, when the electronic device 100 is in a call mode, the display unit 151 may display a user interface (UI) or a graphic user interface (GUI) associated with the call. If the electronic device 100 is in a video communication mode or a photograph mode, the display unit 151 may display a photographed and/or received picture, a UI or a GUI.

The display unit 151 may include a liquid crystal display (LCD), a thin film transistor liquid crystal display (TFT LCD), an organic light-emitting diode (OLED), a flexible display, or a 3-dimensional display. The electronic device 100 may include one or more of such displays.

The display unit 151 may have a transparent or light-transmittive type configuration, hereinafter referred to as a transparent display. A transparent OLED (TOLED) is an example of a transparent display. A rear configuration of the display unit 151 may also have the light-transmittive type configuration. In this configuration, a user is able to see an object located behind the terminal body via the area occupied by the display unit 151 of the terminal body.

At least two display units 151 may be provided. For example, a plurality of display units 151 may be provided on a single face of the electronic device 100 spaced apart from each other or built in one body. Alternatively, each of a plurality of display units 151 may be provided on different faces of the electronic device 100.

If the display unit 151 and a sensor for detecting a touch action (hereafter referred to as a 'touch sensor') are constructed in a mutual-layered structure (hereafter referred to as a 'touch screen'), the display unit 151 may be used as an input device and an output device. For example, the touch sensor may include a touch film, a touch sheet or a touchpad.

The touch sensor can be configured to convert a pressure applied to a specific portion of the display unit 151 or a variation of electrostatic capacity generated from a specific portion of the display unit 151 to an electric input signal. The touch sensor may detect a pressure of a touch as well as a touched position or magnitude of the touch.

If a touch input is made to the touch sensor, a signal(s) corresponding to the touch input is transferred to a touch controller (not shown). The touch controller processes the signal(s) and then transfers corresponding data to the controller 180. The controller 180 may determine, therefore, which portion of the display unit 151 is touched.

With continued reference to FIG. 1, a proximity sensor 141 can be provided within the electronic device 100 enclosed by the touch screen or around the touch screen. The proximity sensor 141 may detect a presence or non-presence of an object approaching a specific detecting surface or an object existing around the proximity sensor 141 using an electromagnetic field strength or infrared ray without mechanical contact. Accordingly, the proximity sensor 141 may have greater durability and greater utility than a contact type sensor.

The proximity sensor 141 can include a transmittive photoelectric sensor, a direct reflective photoelectric sensor, a mirror reflective photoelectric sensor, a radio frequency oscillation proximity sensor, an electrostatic capacity proximity sensor, a magnetic proximity sensor or an infrared proximity sensor. If the touch screen is an electrostatic type touch screen, the proximity sensor 141 may detect proximity of a pointer using a variation of an electric field according to the proximity of the pointer and the touch screen (touch sensor) may be classified as the proximity sensor 141.

An action in which a pointer approaches the touch screen without contacting the touch screen, yet is recognized as being located on the touch screen, is referred to as a 'proximity touch'. An action in which the pointer actually touches the touch screen is referred to as a 'contact touch'. The position on the touch screen proximity-touched by the pointer refers to the position of the pointer that vertically opposes the touch screen when the pointer performs the proximity touch.

The proximity sensor 141 may detect a proximity touch and/or a proximity touch pattern (e.g., proximity touch distance, proximity touch duration, proximity touch position, proximity touch shift state). Information corresponding to the detected proximity touch action and/or the detected proximity touch pattern may be displayed on the touch screen.

The controller 180 (FIG. 1) recognizes the proximity touch as one of various input signals according to proximity depth and position of the pointer. The controller 180 performs various operation controls according to various input signals.

Referring again to FIG. 1, the audio output module 152 may output audio data that is received from the wireless communication unit 110 in, for example, a call-receiving mode, a call-placing mode, a recording mode, a voice recognition mode or a broadcast receiving mode. The audio output module 152 may output audio data stored in the memory 160. The audio output module 152 may output an audio signal relevant to a function (e.g., a call signal receiving sound, a message receiving sound, etc.) performed by the electronic device 100. The audio output module 152 may include, for example, a receiver, a speaker or a buzzer.

The alarm module 153 outputs a signal for announcing an occurrence of a particular event associated with the electronic device 100. Typical events include a call signal reception, a message reception, a key signal input and a touch input. The alarm module 153 outputs a signal for announcing the event occurrence via vibration as well as a video signal or an audio signal. The video signal is output via the display unit 151 and the audio signal is output via the audio output module 152. Hence, at least the display unit 151 or the audio output module 152 can be regarded as part of the alarm module 153.

The haptic module 154 may generate various haptic effects that can be sensed by a user. Vibration is a representative tactile effect generated by the haptic module 154. Strength and pattern of the vibration generated from the haptic module 154 may be controllable. For example, vibrations differing from each other can be output by being synthesized together or can be output in sequence.

The haptic module 154 may generate various haptic effects in addition to vibration. For example, the haptic module 154 may generate an effect caused by a pin array vertically moving against skin being touched, an air injection force via an injection hole, an air suction force via a suction hole, an effect of skimming on a skin surface, an effect of contact with an electrode, an effect of electrostatic power and/or an effect of a hot/cold sense using an endothermic or exothermic device.

The haptic module 154 can be configured to provide the haptic effect via direct contact. The haptic module 154 can also be configured to enable a user to experience the haptic effect via muscular sense of a finger or an arm. Two or more haptic modules 154 can be provided according to a configuration of the electronic device 100.

The memory 160 is configured to store programs for operation of the controller 180. The memory 160 may temporarily store input/output data (e.g., phonebook, message, still picture, moving picture, etc.). The memory 160 may store data of vibration and sound in various patterns output when the touch screen receives a touch input.

The memory 160 may include, for example, a flash memory, a hard disk, a multimedia card micro type memory, a card type memory (e.g., SD memory, XD memory, etc.), a random access memory (RAM), a static random access memory (SRAM), a read-only memory (ROM), an electrically erasable programmable read-only memory (EEPROM), a programmable read-only memory (PROM), a magnetic memory, a magnetic disk or an optical disk. The electronic device 100 may operate in association with a web storage that performs a storage function of the memory 160 via the Internet.

The interface unit 170 couples the electronic device 100 with external devices. The interface unit 170 receives data from an external device. The interface unit 170 is supplied with power and may be configured to deliver the power to elements within the electronic device 100. The interface unit 170 may be configured to enable data to be transferred from the electronic device 100 to an external device. The interface unit 170 may be configured to include a wired/wireless headset port, an external charger port, a wire/wireless data port, a memory card port, a port for coupling to a device having an identity module, an audio input/output (I/O) port, a video input/output (I/O) port or an earphone port.

The identity module (not shown) is a chip or card that stores various types of information for authenticating a use authority of the electronic device 100 and can include a user identity module (UIM), a subscriber identity module (SIM) and/or a universal subscriber identity module (USIM). A device provided with the above identity module (hereafter referred to as an 'identity device') may be manufactured in the form of a smart card. The identity device is connectable to the electronic device 100 via a corresponding port.

The interface unit 170 may be configured as a passage for supplying power to the electronic device 100 from a cradle that is connected to the electronic device 100. The interface unit 170 may facilitate delivery of various command signals, which are input via the cradle by a user, to the electronic device 100. Various command signals input via the cradle or the power may work as a signal for recognizing that the electronic device 100 is correctly loaded in the cradle.

The controller 180 typically controls the overall operations of the electronic device 100. For example, the controller 180 performs control and processing associated with voice calls, data communications and video conferences. The controller 180 may include a multimedia module 181 that provides multimedia playback. The multimedia module 181 may be configured as part of the controller 180 or may be configured as a separate component. The controller 180 may also perform pattern recognizing processing for recognizing a handwriting input performed on the touch screen as a character and/or recognizing a picture drawing input performed on the touch screen as characters or images.

The power supply unit 190 provides power required by the various components for the electronic device 100. The power may be internal power, external power, or combinations thereof.

Figure 2:
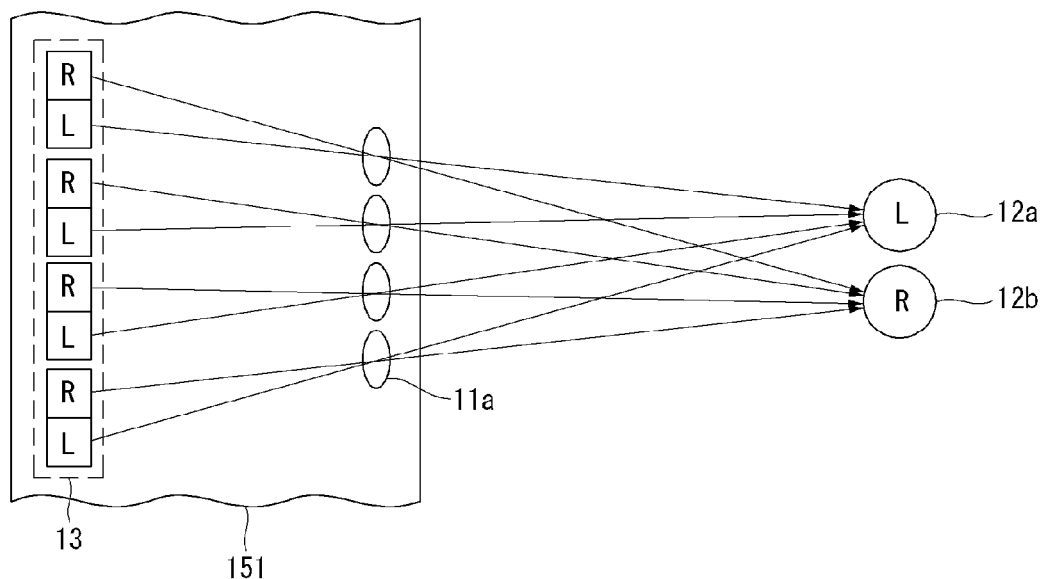
FIGS. 2 and 3 are views illustrating a method of displaying a stereoscopic image using a binocular parallax according to an embodiment of the present invention.
Figure 3:
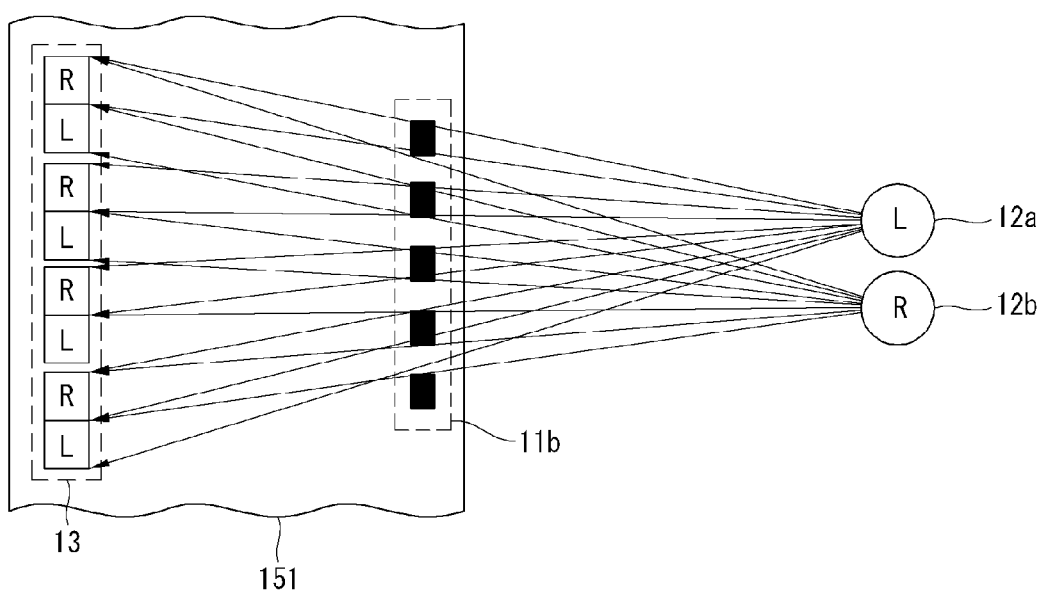

FIGS. 2 and 3 are views illustrating a method of displaying a stereoscopic image using binocular parallax according to the present invention. FIG. 2 illustrates a method in which a lenticular lens array is used and FIG. 3 illustrates a method in which a parallax barrier is used.

Binocular parallax refers to a difference between the sight of human left and right eyes. When a human brain synthesizes the image seen by the left eye with the image seen by the right eye, a stereoscopic effect ensues in which the synthesized images are perceived to have depth. Hereinafter, a phenomenon in which a person experiences the stereoscopic effect in accordance with the binocular parallax is referred to as stereoscopic vision and an image that causes the stereoscopic vision is referred to as a three-dimensional stereoscopic image. In addition, when a specific object included in an image causes the stereoscopic vision, the corresponding object is referred to as a stereoscopic object.

Methods of displaying a three-dimensional stereoscopic image in accordance with the binocular parallax are divided into a glass type, in which special glasses are required, and a non-glass type, in which glasses are not required. The glass type method includes using color glasses having wavelength selectivity, using polarized glasses for a light shielding effect in accordance with a polarization difference, or time division glasses to alternately provide left and right images within the latent image time of eyes. There is also a method of mounting filters having different transmittances in the left and right glasses to obtain the stereoscopic effect with respect to left and right movements in accordance with the time difference of a visuometer, which is caused by a difference in transmittance.

The non-glass type methods in which the stereoscopic effect is generated not by an observer, but by an image display surface, includes a parallax barrier method, a lenticular lens method, or a microlens array method.

Referring to FIG. 2, in order to display the three-dimensional stereoscopic image, the display unit 151 includes a lenticular lens array 11a. The lenticular lens array 11a is positioned between a display surface 13, on which pixels L to be input to a left eye 12a and pixels R to be input to a right eye 12b are alternately arranged in a horizontal direction, and the left and right eyes 12a and 12b. The lenticular lens array 11a provides optical discriminative directivity with respect to the pixels L to be input to the left eye 12a and the pixels R to be input to the right eye 12b. The image that passes through the lenticular lens array 11a is divisionally observed by the left eye 12a and the right eye 12a and a human brain synthesizes the image seen through the left eye 12a with the image seen through the right eye 12b to observe the three-dimensional stereoscopic image.

Referring to FIG. 3, in order to display the three-dimensional stereoscopic image, the display unit 151 includes a perpendicular latticed parallax barrier 11b. The parallax barrier 11b is positioned between the display surface 13, on which the pixels L to be input to the left eye 12a and the pixels R to be input to the right eye 12b are alternately arranged in the horizontal direction, and the left and right eyes 12a and 12b. In this manner, an image is divisionally observed by the left eye 12a and the right eye 12b through a perpendicular latticed aperture. The human brain synthesizes the image seen through the left eye 12a with the image seen through the right eye 12b to observe the three-dimensional stereoscopic image. The parallax barrier 11b is turned on only when the three-dimensional stereoscopic image (two-dimensional image) is to be displayed to separate incident time and is turned off when a plane image is to be displayed to transmit the incident time without being separated.

The above-described methods of displaying a three-dimensional stereoscopic image are for describing the embodiments of the present invention. However, the present invention is not limited to these methods. According to the present invention, the three-dimensional stereoscopic image using the binocular parallax may be displayed using various methods other than the above-described methods.

Figure 4A:
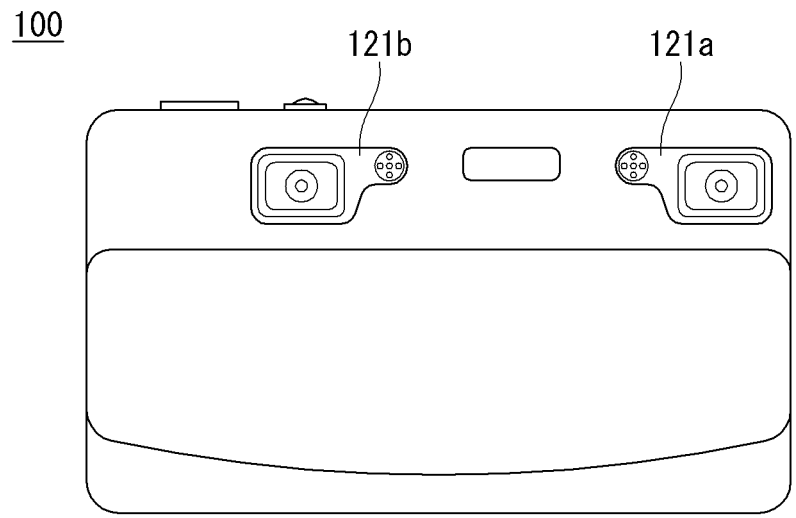
FIGS. 4A-5B are views illustrating an outer appearance of an electronic device according to an embodiment of the present invention.
Figure 4B:
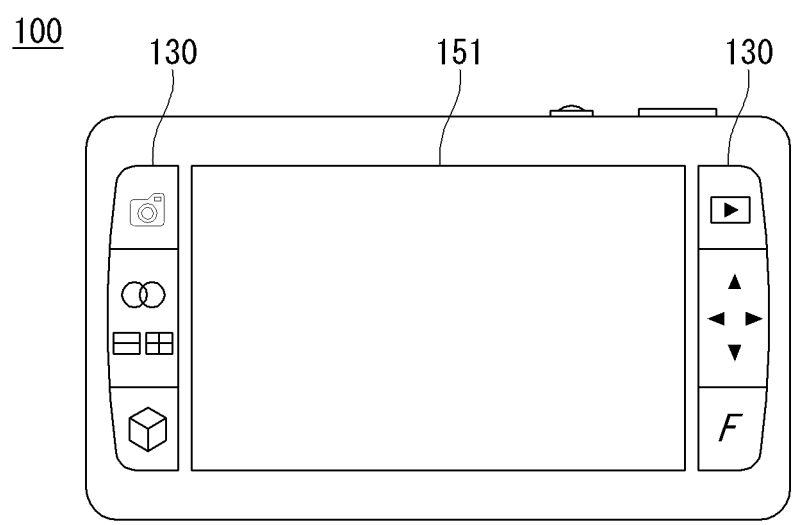
Figure 5A:
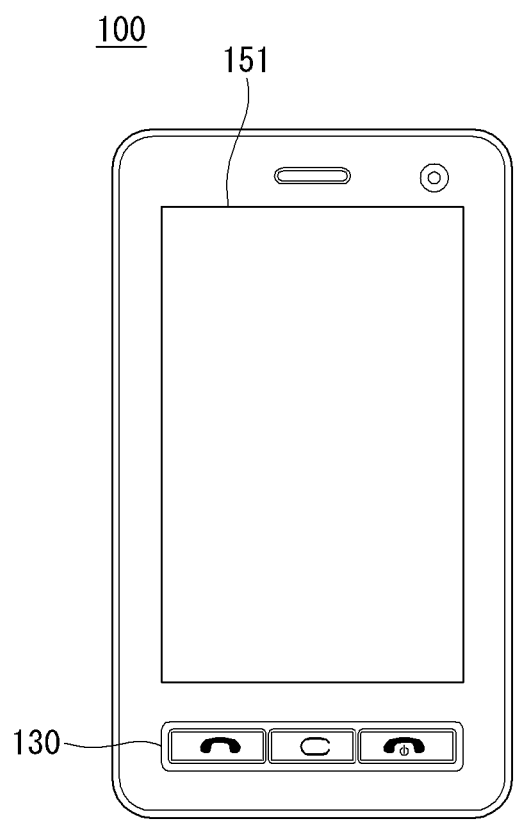
Figure 5B:
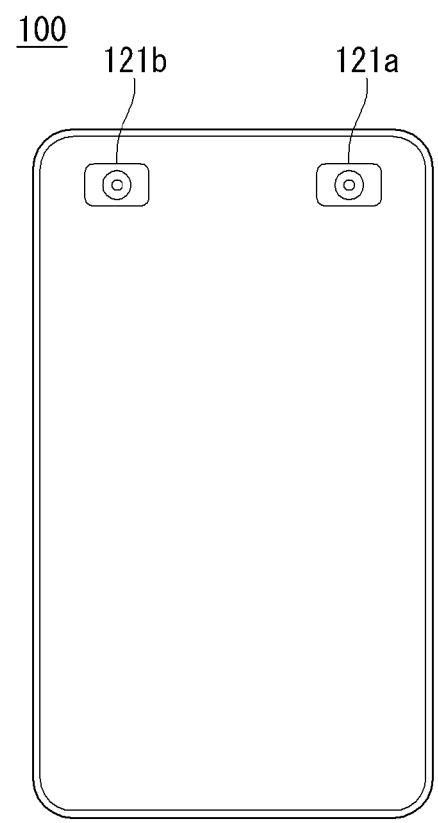

FIGS. 4A-5B are views illustrating an outer appearance of an electronic device 100 according to an embodiment of the present invention. FIGS. 4A and 4B illustrate the electronic device 100 as a digital camera, and FIGS. 5A and 5B illustrate the electronic device 100 as a mobile terminal.

Referring to FIGS. 4A and 4B, the digital camera 100 may include a single body. FIG. 4A illustrates a front surface of the digital camera 100, and FIG. 4B illustrates a rear surface of the digital camera 100. A plurality of camera modules including at least a first camera module 121a and a second camera module 121b may be provided on the front surface of the digital camera 100, as shown in FIG. 4A. The display unit 151 and the user input unit 130, such as a key pad, may be provided on the rear surface of the digital camera 100, as shown in FIG. 4B. A circuit implementing the controller 180 (FIG. 1) may be included in the body of the digital camera 100.

Referring to FIGS. 5A and 5B, the mobile terminal 100 may include a single bar-shaped body. FIG. 5A illustrates a front surface of the mobile terminal 100, and FIG. 5B illustrates a rear surface of the mobile terminal 100. A plurality of camera modules, including at least a first camera module 121a and a second camera module 121b, may be provided on the rear surface of the mobile terminal 100, as shown in FIG. 5(b). The display unit 151 and the user input unit 130, such as a key pad, may be provided on the front surface of the mobile terminal 100, as shown in FIG. 5(a). A circuit implementing the controller 180 (FIG. 1) is provided in the body of the mobile terminal 100.

The body of the electronic device 100 may include various shapes and configurations. For example, the mobile terminal 100 may be implemented as a clam-shell type body. Additionally, the position of each component of the electronic device 100 may vary. For example, the first camera module 121a of the mobile terminal 100 of FIG. 5B may be arranged on an upper portion of the rear surface of the body depicted in FIG. 4A (or upper portion of the front surface of the body depicted in FIG. 5B) and the second camera module 121b may be arranged on a lower portion of the rear surface of the body depicted in FIG. 4A (or lower portion of the front surface of the body depicted in FIG. 5B). Images captured by the first camera module 121a and the second camera module 121b may be synthesized to generate a stereoscopic image.

FIGS. 6A and 6B illustrate an example of capturing a plurality of images using the first camera module 121a and the second camera module 121b provided in the electronic device 100 to generate a stereoscopic image according to an embodiment of the present invention. FIG. 6A illustrates an example of capturing an image of an object 6a for a left eye by the first camera module 121a, and FIG. 6B illustrates an example of capturing an image of the same object 6a for a right eye by the second camera module 121b.

As shown in FIGS. 6A and 6B, the electronic device 100 acquires the image for the left eye and the image for the right eye, which has a different parallax than the image for the left eye, through the first and second camera modules 121a and 121b. The controller 180 (FIG. 1) combines the acquired images for the left and right eyes to generate a stereoscopic image.

The exemplary embodiments disclosed herein may be implemented by the electronic device 100 described with reference to FIGS. 1 to 6B. A method of controlling the electronic device 100 and an operation of the electronic device 100 according to an embodiment of the present invention will be described with reference to the accompanying drawings.

Figure 7:
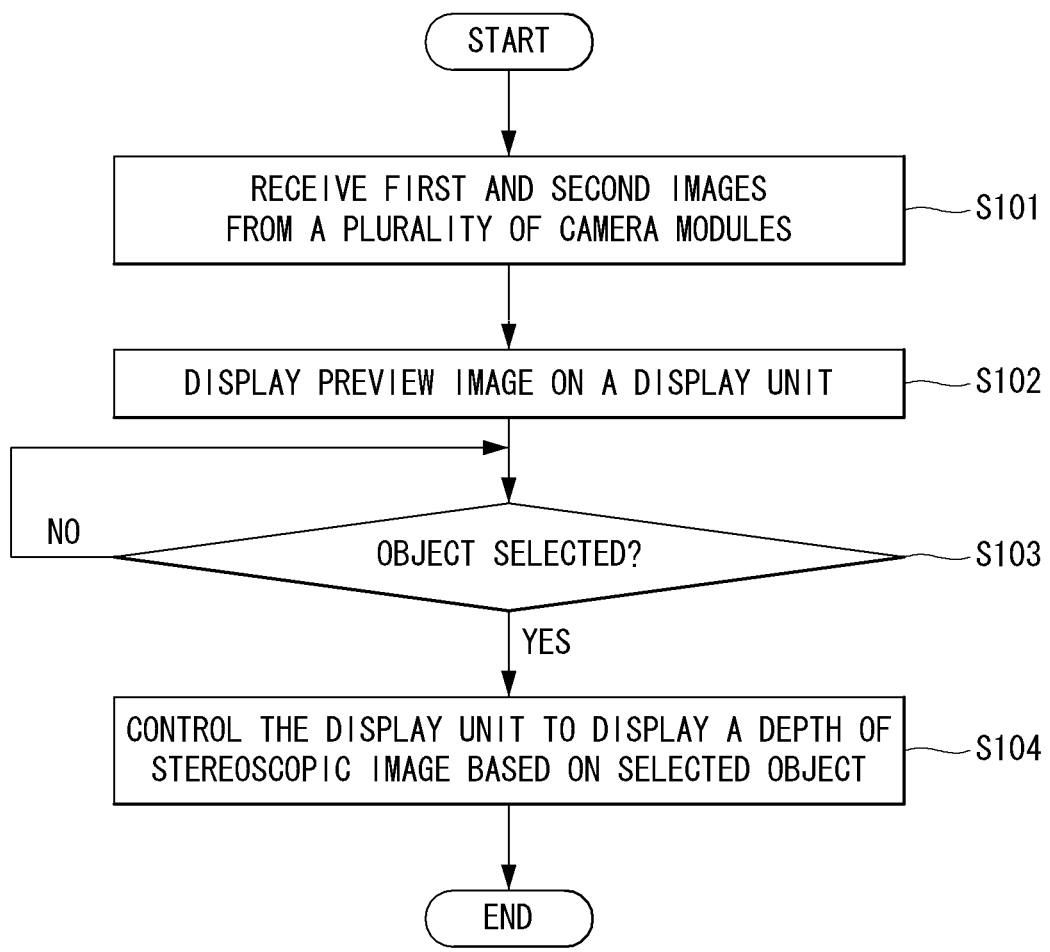
FIG. 7 is a flowchart illustrating a method of controlling an electronic device according to an embodiment of the present invention.

FIG. 7 is a flowchart illustrating a method of controlling the electronic device 100 (FIGS. 4A-5B) according to an embodiment of the present invention. Referring to FIG. 7, the controller 180 (FIG. 1) receives input of a first image corresponding to an image for a left eye and a second image corresponding to an image for a right eye from the plurality of camera modules, such as the first and second camera modules 121a (FIGS. 4A and 5A) and 121b (FIGS. 4A and 5A) (S101). The controller 180 (FIG. 1) controls the display unit 151 (FIGS. 4B and 5B) to display a preview image captured by at least one of the plurality of camera modules, such as the first and second camera modules 121a and 121b on a display area of the display unit 151 (S102). For example, the controller 180 (FIG. 1) may display the first image received from the first camera module 121a, the second image received from the second camera module 121b, or an overlapping image of the first and second images as the preview image.

FIGS. 8 to 15 illustrate examples of the electronic device 100 (FIGS. 4A-5B) displaying a preview image.

Figure 8:
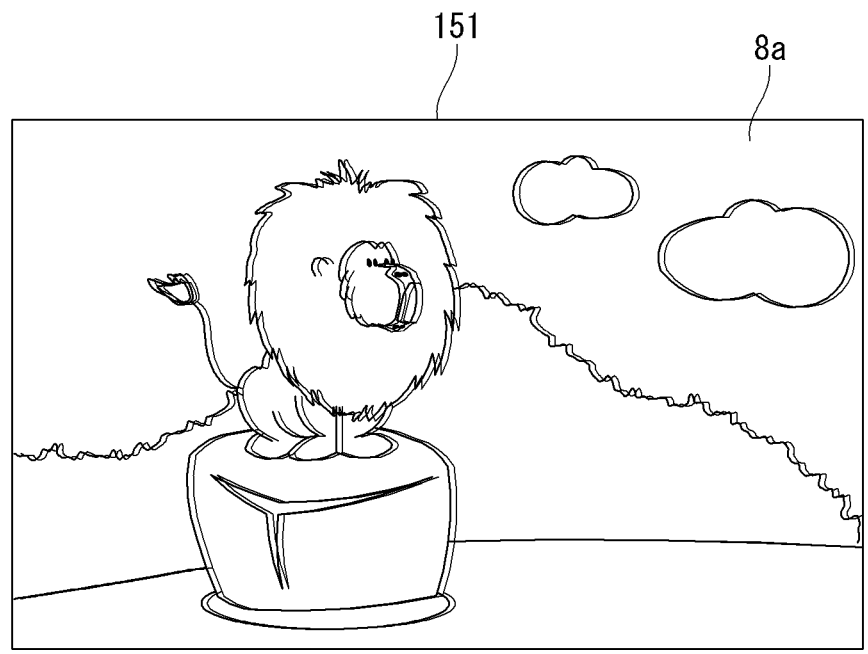
FIG. 8 is a view illustrating an example of displaying a synthesized image obtained by overlapping a plurality of images as a preview image according to an embodiment of the present invention.

FIG. 8 illustrates an example of displaying a synthesized image 8a as a preview image on the display unit 151. The synthesized image is obtained by overlapping the first image received from the first camera module 121a and the second image received from the second camera module 121b.

Figure 9:
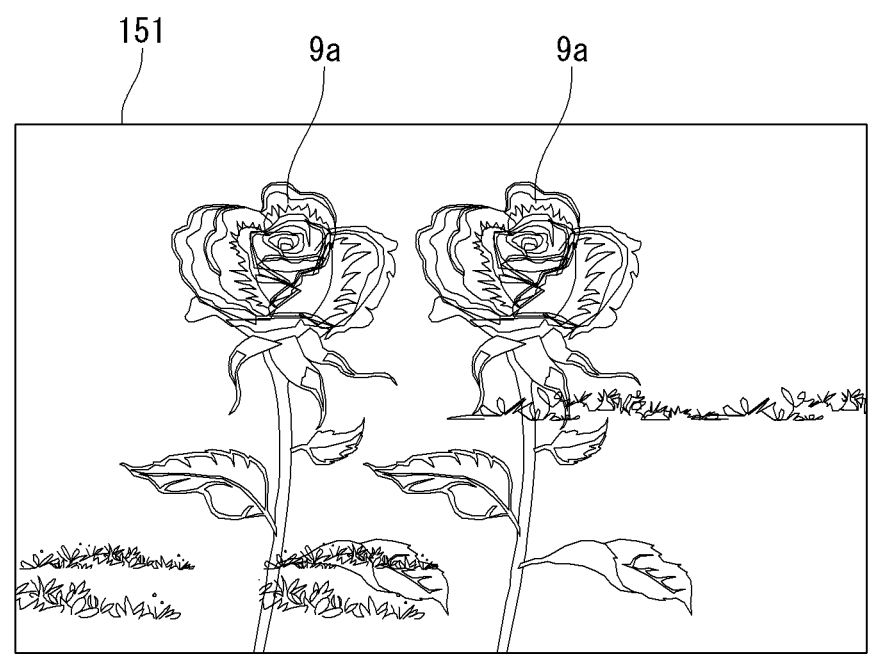
FIG. 9 is a view illustrating an example of displaying a synthesized image obtained by overlapping a plurality of images as a preview image included in an electronic device according to an embodiment of the present invention.

When an image of a nearby object is captured by the first and second camera modules 121a and 121b (FIGS. 4A and 5A, the position of the object in the first and second images may differ considerably from each other. FIG. 9 illustrates an example of displaying a synthesized image obtained by overlapping the first image received from the first camera module 121a (FIGS. 4A and 5A) and the second image received from the second camera module 121b (FIGS. 4A and 5A) as a preview image, wherein the first and second images are obtained by capturing images of a nearby object 9a.

It can be seen from FIG. 9 that the position of the object 9a in the first image (right side) is considerably different from the position of the object 9a in the second image (left side). Accordingly, when a user selects the object by touching the object in the preview image, the object of the first image and the object of the second image displayed near the touched point may be different from each other. As a result, a plurality of objects may be positioned near the touched point in the preview image.

Accordingly, an image received from one of the plurality of camera modules, such as the first and second camera modules 121a and 121b (FIGS. 4A and 5A), may be displayed on the display unit 151 as the preview image, or a plurality of images received from the plurality of camera modules 121a and 121b may be displayed as the preview image independently from each other. Further, an image received from one of the plurality of camera modules 121a and 121b and a stereoscopic image may be displayed together as the preview image.

Figure 10:
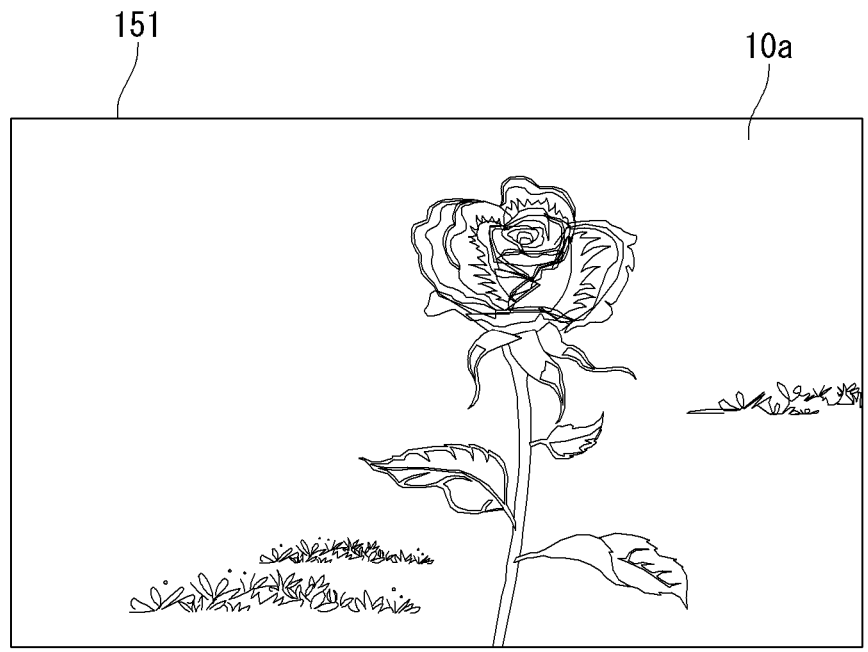
FIG. 10 is a view illustrating an example of displaying an image received from any one of a plurality of camera modules as a preview image according to an embodiment of the present invention.

FIG. 10 illustrates an example of displaying an image received from one of the plurality of camera modules, such as the first and second camera modules 121a and 121b (FIGS. 4A and 5A) as a preview image. Referring to FIG. 10, a first image 10a received from the first camera module 121a (FIGS. 4A and 5A) is displayed on the display unit 151. Accordingly, the controller 180 (FIG. 1) controls a depth of the stereoscopic image based on the object selected from the first image 10a.

Figure 11:
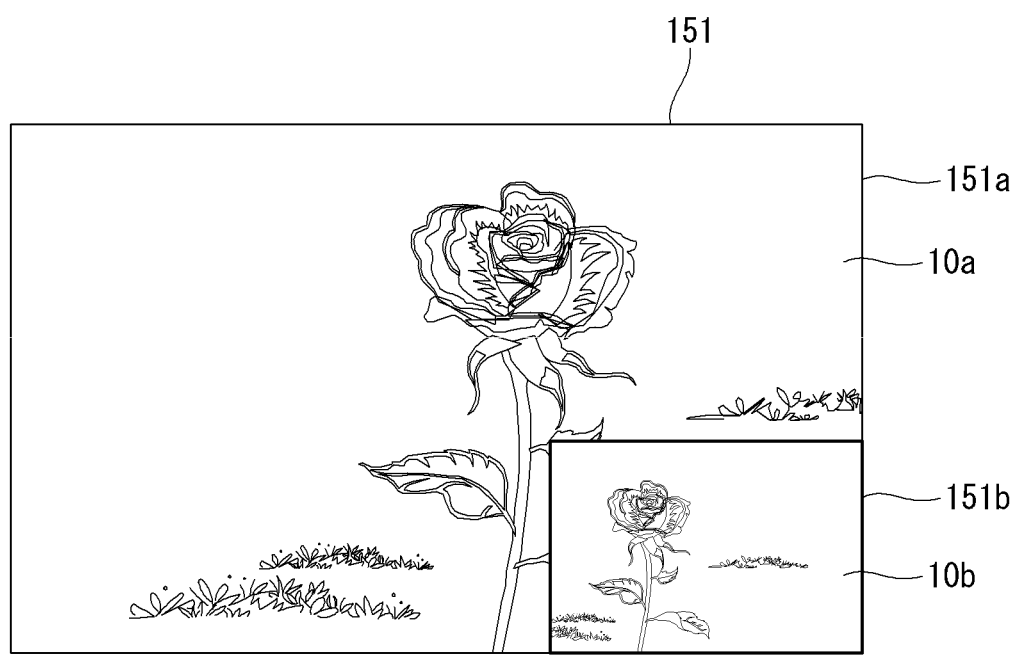
FIGS. 11 to 13 are views illustrating examples of displaying a plurality of images received from a plurality of camera modules independently from each other as preview images according to an embodiment of the present invention.
Figure 12:
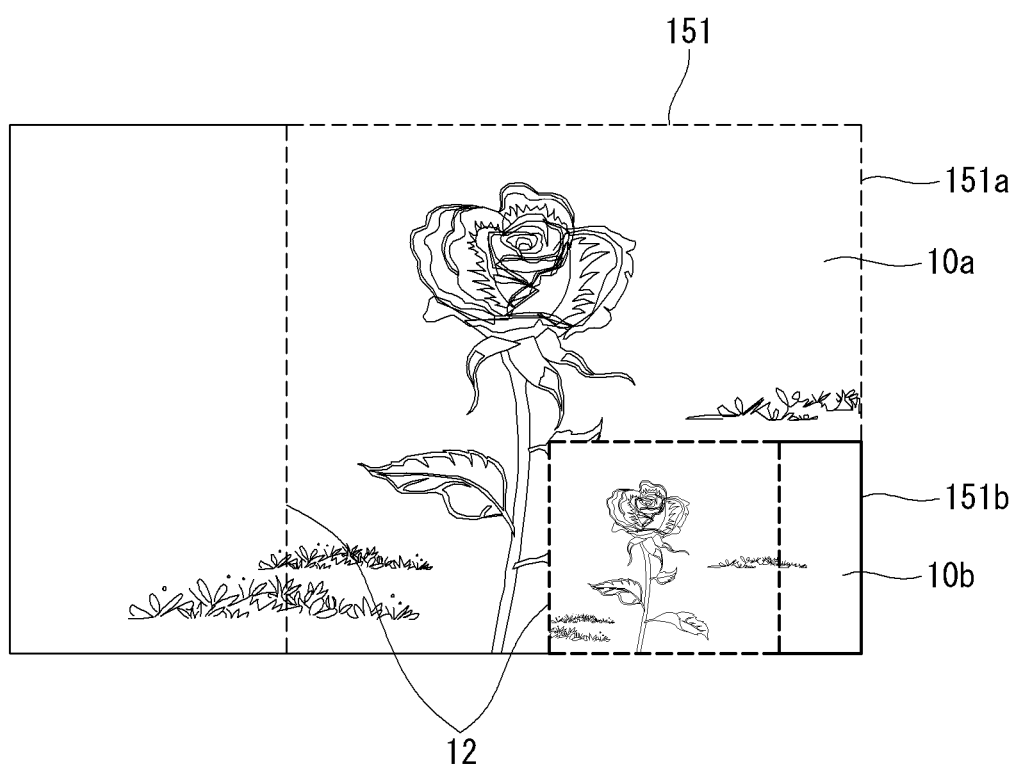
Figure 13:
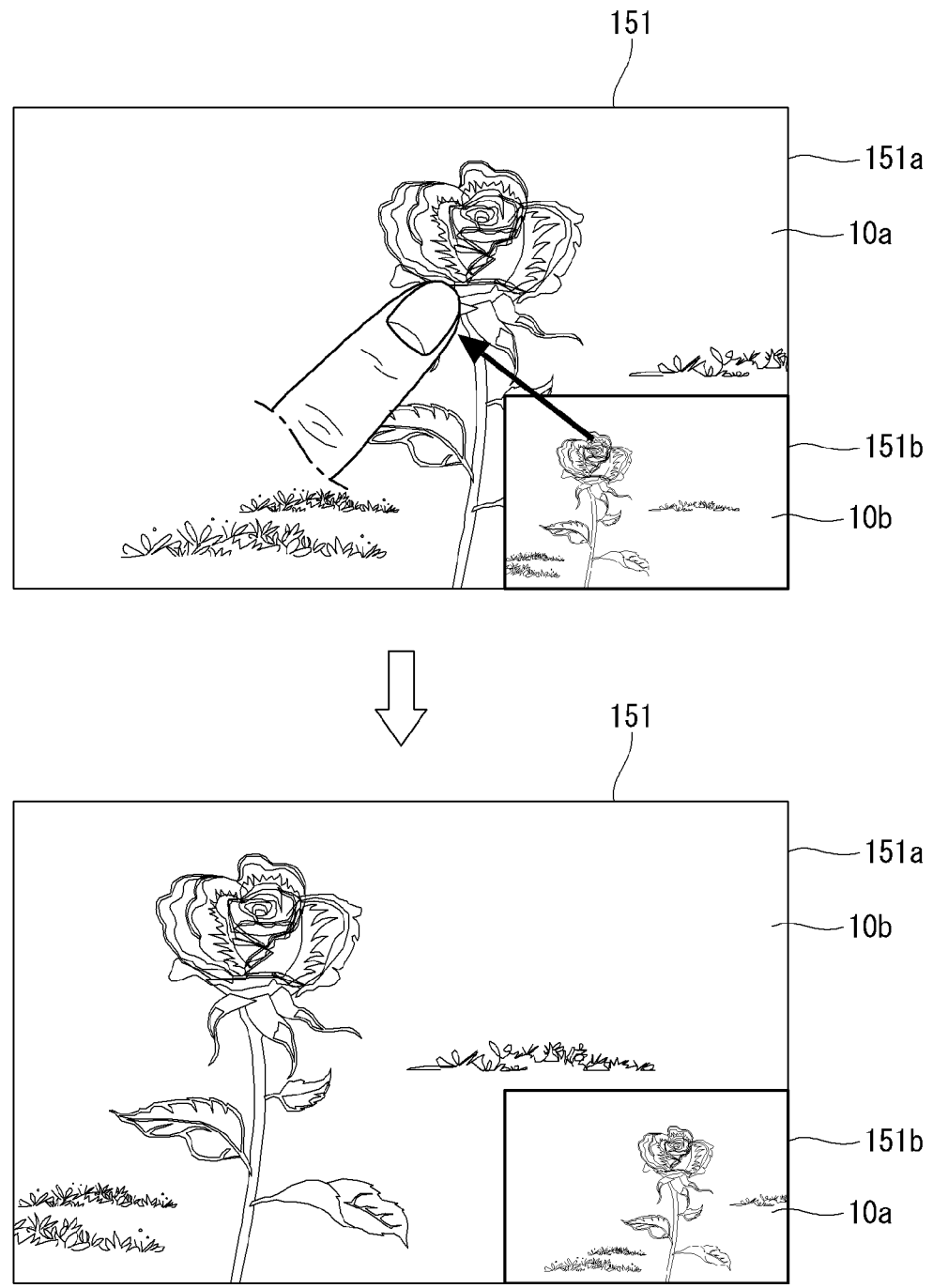

FIGS. 11 to 13 illustrate examples of displaying a plurality of images received from the plurality of camera modules, such as the first and second camera modules 121a and 121b (FIGS. 4A and 5A) as a preview image, independently from each other. Referring to FIG. 11, a display area may include a first display area 151a and a second display area 151b. The first image 10a received from the first camera module 121a (FIGS. 4A and 5A) is displayed on the first display area 151a, and the second image 10b received from the second camera module 121b (FIGS. 4A and 5A) is displayed on the second display area 151b. Accordingly, the controller 180 (FIG. 1) controls the display unit 151 to display a depth of the stereoscopic image based on an object selected from the first image 10a or the second image 10b.

FIG. 12 illustrates an example of dividing the display unit 151 into the first display area 151a and the second display area 151b. However, the present invention is not limited to the method described in connection with FIG. 12, and various methods may be employed. The first and second display areas 151a and 151b may be logically divided areas or physically divided areas of a single display area of the display unit 151.

Referring to FIG. 12, when the first image 10a and the second image 10b are displayed as the preview image independently from each other, the controller 180 (FIG. 1) may control the display unit 151 to display regions 12 of the images 10a and 10b that are included in a stereoscopic image upon generating the stereoscopic image. Accordingly, a user may intuitively recognize the regions included in the stereoscopic image.

FIG. 13 illustrates an example of exchanging the displayed position of the first image 10a and the second image 10b via manipulation from a user. Referring to FIG. 13, the first image 10a received from the first camera module 121a (FIGS. 4A and 5A) is displayed on the first display area 151a of the display unit 151, and the second image 10b received from the second camera module 121b (FIGS. 4A and 5A) is displayed on the second display area 151b of the display unit 151. As a drag input starting on the second display area 151b of the display unit 151 and ending on the first display area 151a of the display unit 151 is entered by a user, the controller 180 (FIG. 1) controls the display unit 151 to display the second image 10b received from the second camera module 121b on the first display area 151a of the display unit 151 and to display the first image 10a received from the first camera module 121a on the second display area 151b of the display unit 151.

Figure 14:
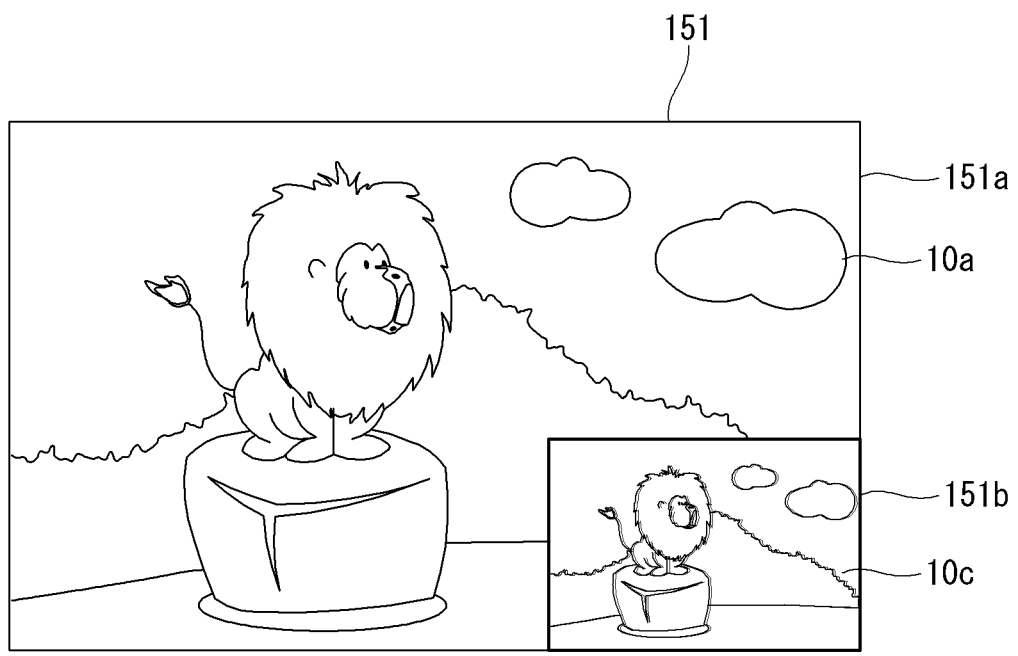
FIG. 14 is a view illustrating an example of displaying a stereoscopic image and an image received from any one of a plurality of camera modules as a preview image according to an embodiment of the present invention.
Figure 15:
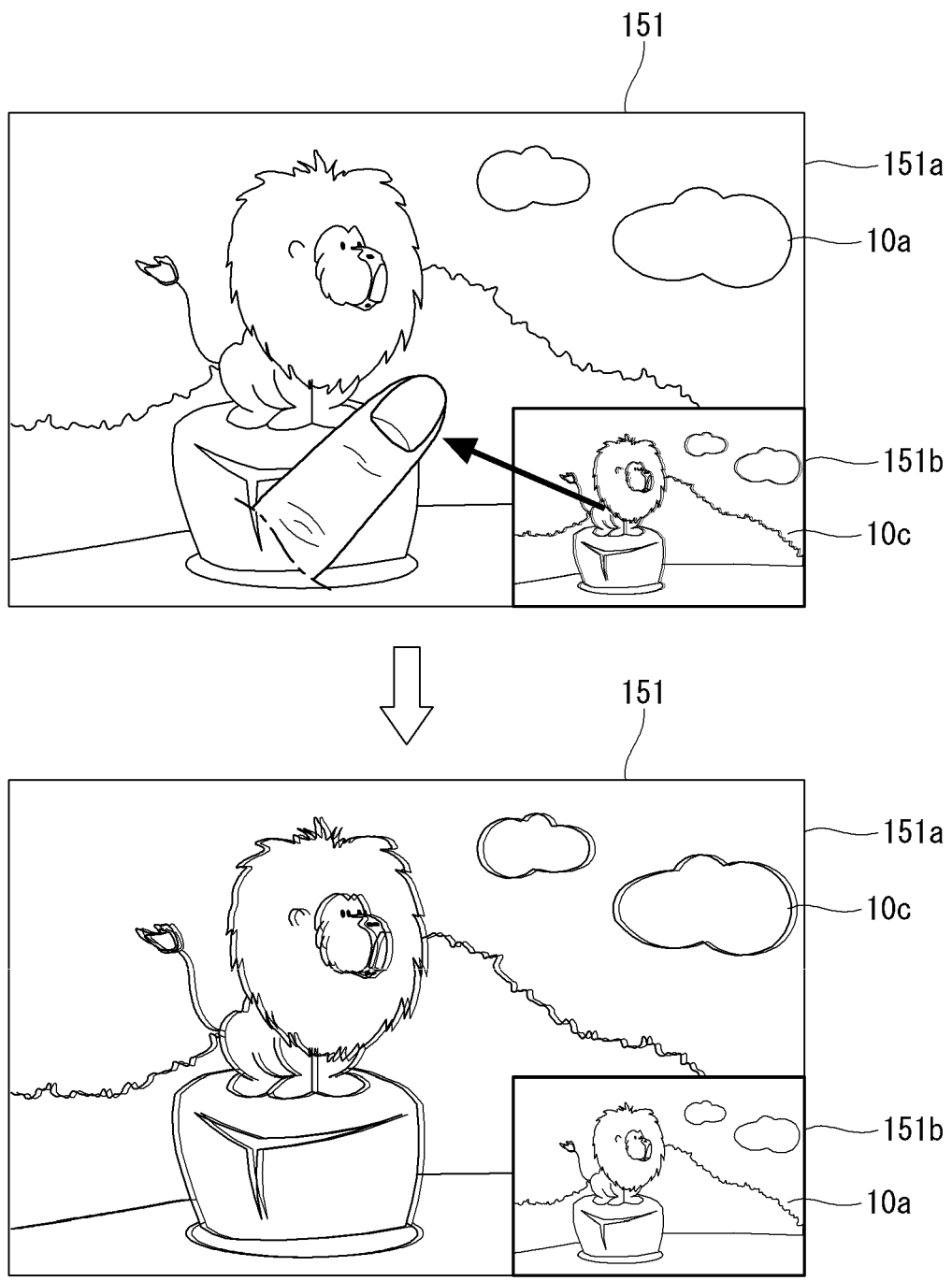
FIG. 15 is a view illustrating an example of adjusting a displayed position of a first image and a stereoscopic image via manipulation of a user in an electronic device according to an embodiment of the present invention.

FIGS. 14 and 15 illustrate an example of displaying an image received from one of the plurality of camera modules, such as the first and second camera modules 121a and 121b (FIGS. 4A and 5A), and a stereoscopic image as a preview image. Referring to FIG. 14, the first image 10a received from the first camera module 121a (FIGS. 4A and 5A) is displayed on the first display area 151a of the display unit 151, and a stereoscopic image 10c obtained by synthesizing the first image 10a with the second image 10b is displayed on the second display area 151b of the display unit 151. The stereoscopic image 10c may be a preview image stored in the memory 160 (FIG. 1) when the image is captured and may be displayed using a method of displaying a stereoscopic image that does not require glasses, such as the non-glasses type described previously.

The display unit 151 may include a panel that allows a stereoscopic image to be displayed by the lenticular lens method or the parallax barrier method described previously. Alternatively, the panel may be partially turned on and off. The display unit 151 may be controlled to display a stereoscopic image on only one of the first display area 151a or the second display area 151b when the non-glasses type method of displaying the stereoscopic image is used.

The controller 180 (FIG. 1) controls the display unit 151 to display a depth of the stereoscopic image 10c displayed on the second display area 151b based on an object selected from the first image 10a. A user may select the object and intuitively identify the depth of the stereoscopic image as being adjustable. The displayed position of the first image 10a and the stereoscopic image 10c shown in FIG. 14 is merely an example and thus may vary, for example, via manipulation by the user.

FIG. 15 illustrates an example of the displayed position of the first image 10a and the stereoscopic image 10c being exchanged via manipulation by the user. Referring to FIG. 15, the first image 10a is displayed on the first display area 151a of the display unit 151 and the stereoscopic image 10c is displayed on the second display area 151b of the display unit 151. As a drag input starting on the second display area 151b of the display unit 151 and ending on the first display area 151a of the display unit 151 is entered by a user, the controller 180 (FIG. 1) controls the display unit 151 to display the stereoscopic image 10c on the first display area 151a of the display unit 151 and to display the first image 10a received from the first camera module 121a (FIGS. 4A and 5A) on the second display area 151b of the display unit 151.

The preview image capturing method may shift automatically between capturing an image of a nearby object and capturing an image of a distant object. For example, when an image of a distant object is captured, a preview image may be displayed according to the method described in connection with FIG. 8, and when an image of a nearby object is captured, a preview image may be displayed according to the method described in connection with FIGS. 10 to 15. Methods for determining whether a target object is located far or near are well known and may be easily implemented by one of ordinary skill in the art. Thus, further detailed description thereof will be omitted.

Referring again to FIG. 7, when a specific object of at least one object included in the preview image is selected while the preview image is displayed on the display unit 151 (FIG. 1) ("YES" at step S103), the controller 180 (FIG. 1) controls the display unit 151 to display a depth of the stereoscopic image based on the selected object (S104). Upon generating the stereoscopic image by synthesizing the first image with the second image, the controller 180 controls the display unit 151 to display the depth between the two images based on the selected object. The parallax between the two images may be controlled by adjusting the position where the two images are synthesized upon combining the two images.

Figure 16:
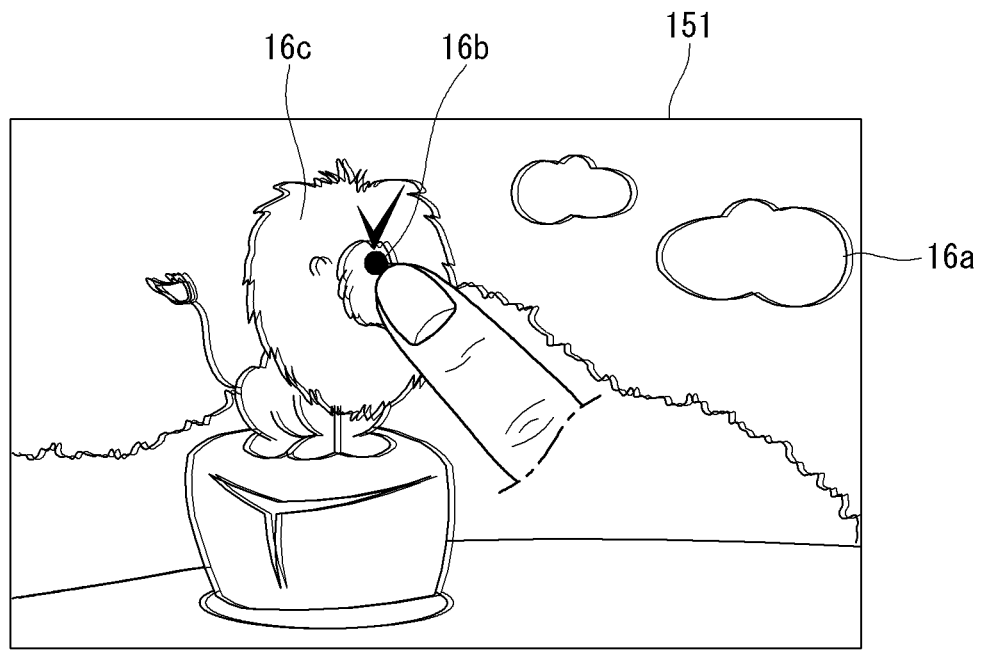
FIGS. 16 and 17 are views illustrating examples of selecting a specific object from a preview image in an electronic device according to an embodiment of the present invention.
Figure 17:
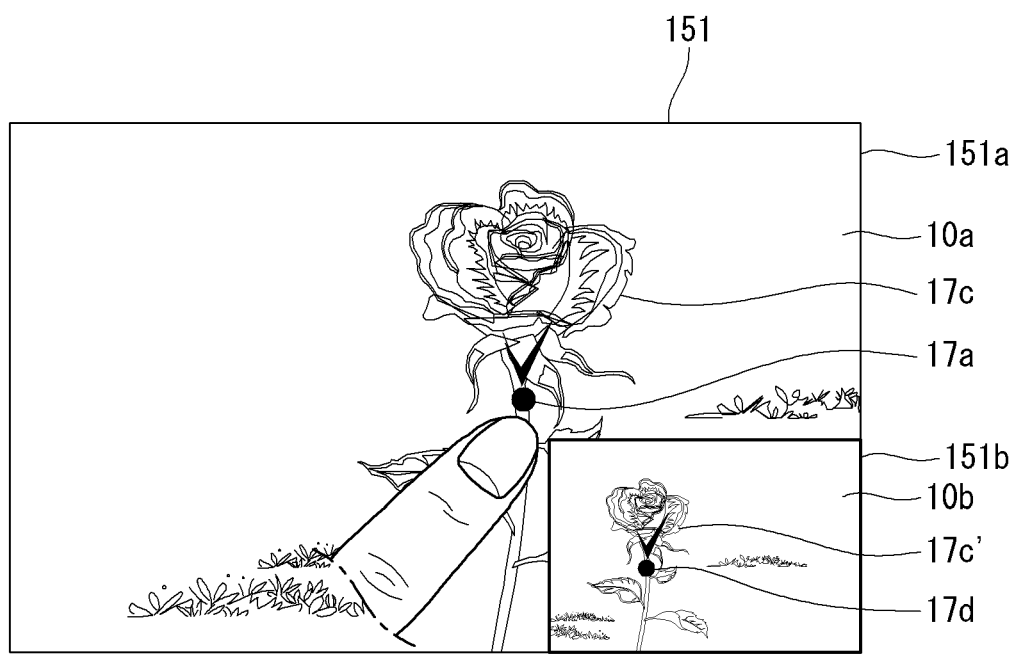

FIGS. 16 and 17 illustrate examples of selecting a specific object in a preview image. Referring to FIG. 16, a synthesized image 16a obtained by overlapping a first image received from the first camera module 121a (FIGS. 4A and 5A) and a second image received from the second camera module 121b (FIGS. 4A and 5A) is displayed on the display unit 151 as a preview image. When a display area of the display unit 151 is touched at a point 16b while the preview image is displayed thereon, the controller 180 (FIG. 1) selects an object 16c displayed at the touched point 16b among at least one object included in the preview image.

Referring to FIG. 17, the first image 10a received from the first camera module 121a (FIGS. 4A and 5A) is displayed on the first display area 151a of the display unit 151, and the second image 10b received from the second camera module 121b (FIGS. 4A and 5A) is displayed on the second display area 151b of the display unit 151. When the first display area 151a is touched at a point 17a while the preview image is displayed on the display unit 151, the controller 180 (FIG. 1) selects an object 17c displayed at the touched point 17a among at least one object included in the first image 10a.

Accordingly, the controller 180 (FIG. 1) controls the display unit 151 to display an icon 17d in the second display area 151b in which an object 17c', corresponding to the object 17c displayed in the first display area 151a, is selected among at least one object included in the second image 10b to indicate that the corresponding object 17c has been selected. More particularly, the controller 180 (FIG. 1) controls the display unit 151 to display the selected object 17c' on the second image 10b. Accordingly, a user may intuitively recognize that the object 17c displayed on the first display area 151a of the display unit 151 was properly selected.

The example of FIG. 17 for displaying the selected object 17c' on the second image 10b is merely one of various methods for displaying the selected object 17c' among the at least one object included in the second image 10b. For example, the controller 180 (FIG. 1) may control the display unit 151 to display the outline of the selected object 17c' so that the object 17c' is differentiated from other portions of the displayed image. As one example, the controller 180 (FIG. 1) may control the display unit 151 to provide a 3D effect on the selected object 17c' to differentiate the object 17c' from the other portions of the displayed image.

Figure 18A:
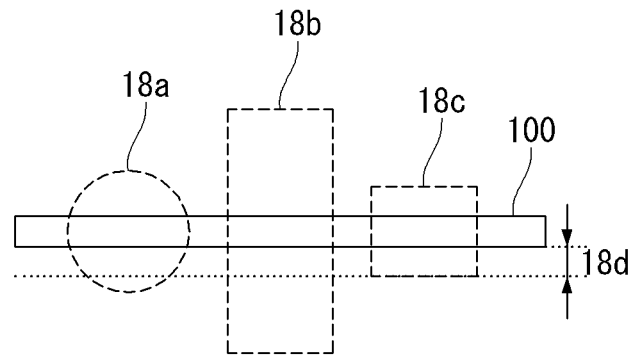
FIGS. 18A and 18B are views illustrating an example of adjusting a depth of a stereoscopic image based on an object selected from a preview image in an electronic device according to an embodiment of the present invention.
Figure 18B:
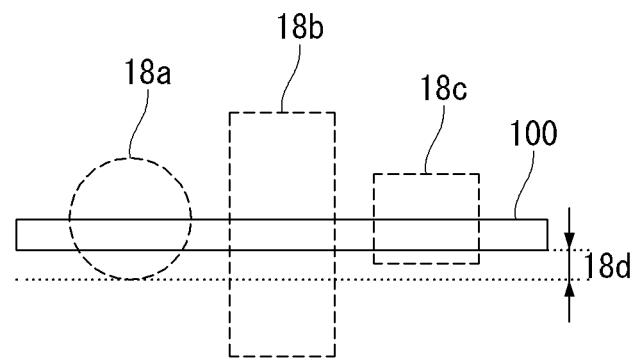

FIGS. 18A and 18B illustrate an example of how depth of a stereoscopic image varies based on an object selected in a preview image. FIG. 18A illustrates a stereoscopic image prior to selection of an object within the image, and FIG. 18B illustrates a stereoscopic image after selection of the object. Referring to FIGS. 18A and 18B, as a first object 18a is selected among stereoscopic objects 18a, 18b, and 18c included in the stereoscopic image, the controller 180 (FIG. 1) controls the parallax of the image such that a depth of the first object 18a in the stereoscopic image is set as a reference depth 18d, e.g., '0'.

Conventionally, the depth of a stereoscopic image is adjusted by moving a position where a left image and a right image are synthesized on a per-pixel basis via button manipulation by a user. However, according to an embodiment of the present invention, a user may adjust the depth of a stereoscopic image by merely selecting a displayed object that serves as a reference.

Figure 19:
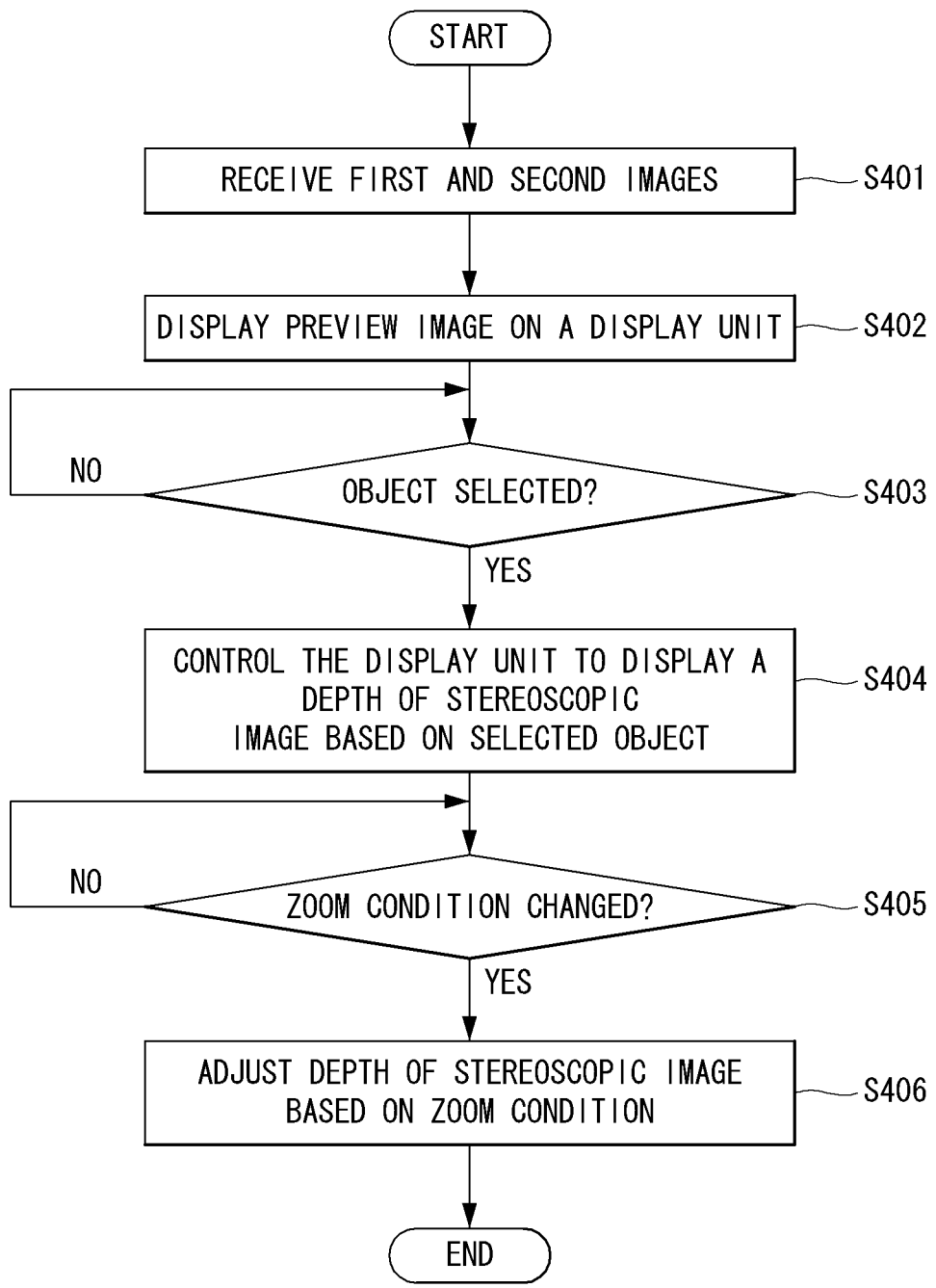
FIG. 19 is a flowchart illustrating a method of controlling an electronic device according to an embodiment of the present invention.
Figure 20:
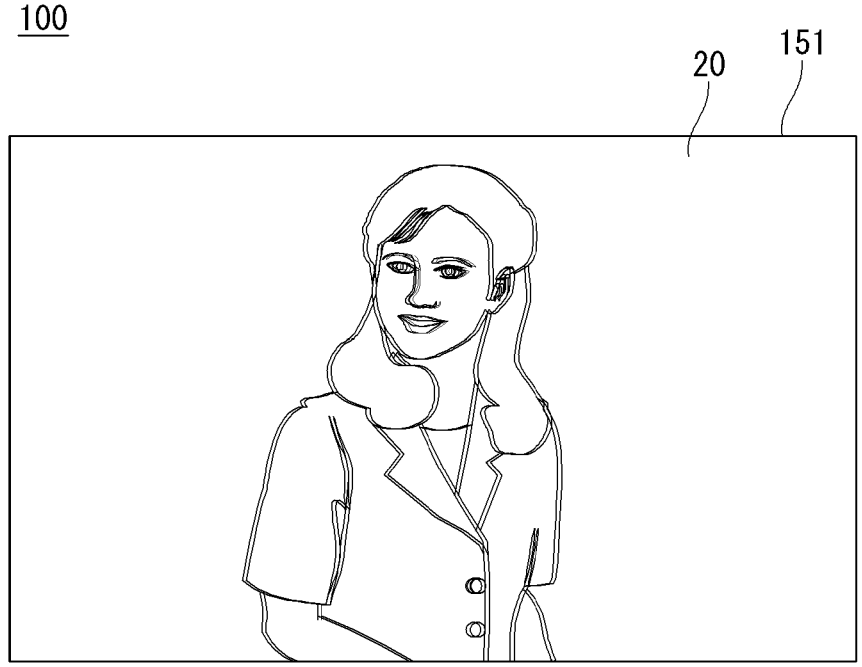
FIG. 20 is a view illustrating an example of displaying a preview image of a stereoscopic image on a display unit of an electronic device according to an embodiment of the present invention.
Figure 21:
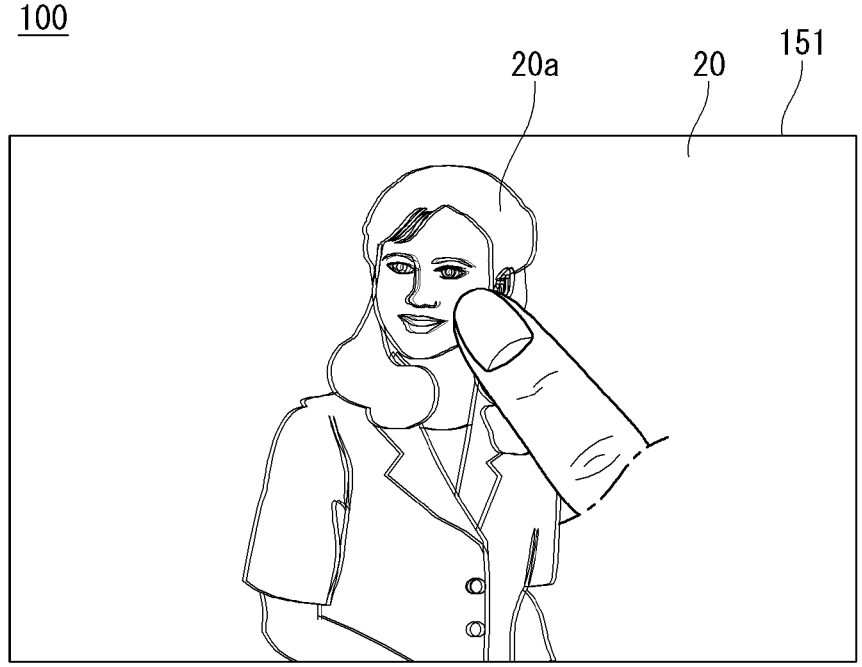
FIG. 21 is a view illustrating an example of selecting a specific object from a preview image in an electronic device according to an embodiment of the present invention.
Figure 22:
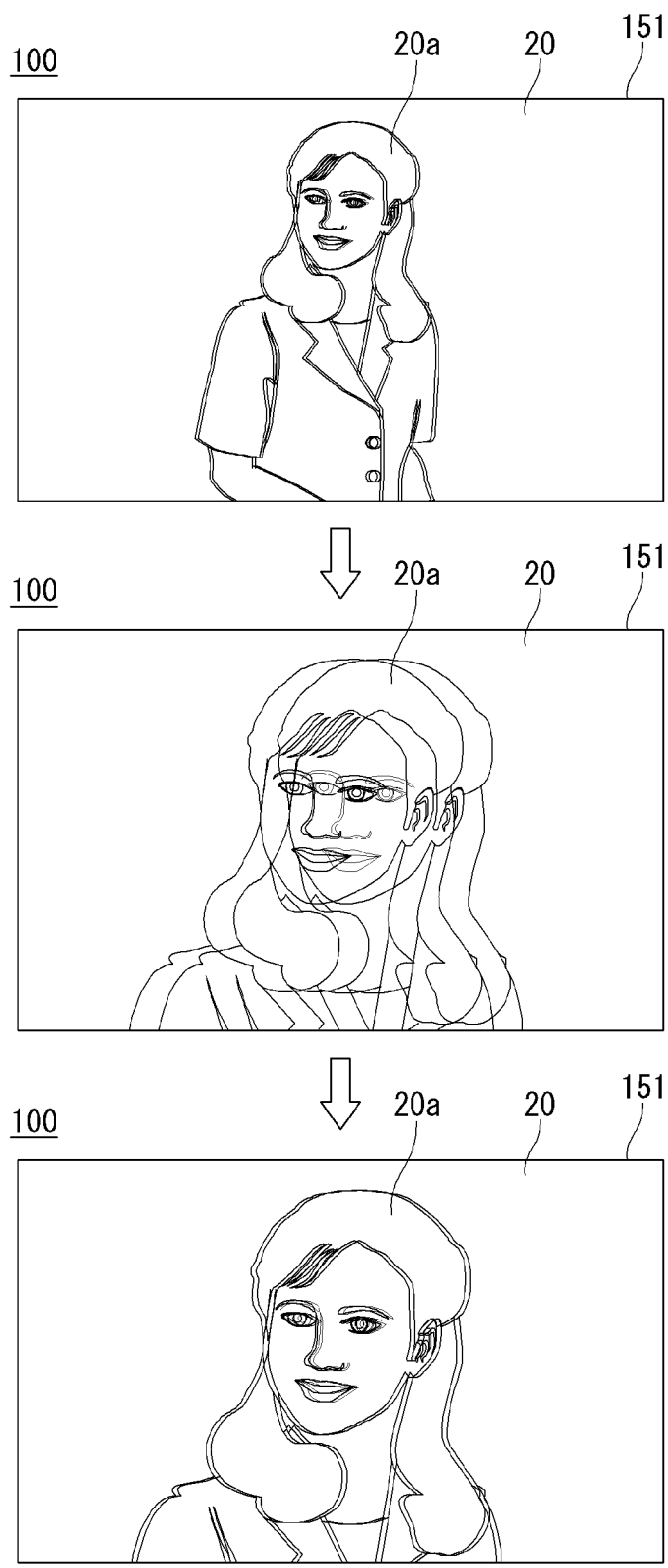
FIG. 22 is a view illustrating an example of automatically adjusting a depth of a stereoscopic image when a zoom condition of a plurality of camera modules is changed according to an embodiment of the present invention.

A method of controlling the electronic device 100 (FIGS. 4A-5B) and an operation of the electronic device 100 according to an embodiment of the present invention will now be described with reference to the accompanying drawings. FIG. 19 is a flowchart illustrating a method of controlling the electronic device 100 according to an embodiment of the present invention. FIGS. 20-22 are views illustrating a method of controlling the electronic device 100 according to an embodiment of the present invention.

Referring to FIG. 19, the controller 180 (FIG. 1) receives input of a first image corresponding to an image for the left eye and a second image corresponding to an image for the right eye from the plurality of camera modules including a first camera module 121a (FIGS. 4A and 5A) and a second camera module 121b (FIGS. 4A and 5A) (S401). The controller 180 (FIG. 1) acquires a preview image through at least one of the first or second camera module 121a and 121b (FIGS. 4A and 5A) and displays the acquired preview image on a display area of the display unit 151 (FIGS. 4B and 5B) (S402).

The preview image may be the first image received from the first camera module 121a or the second image received from the second camera module 121b. Alternatively, the preview image may be a synthesized image obtained by overlapping the first image and the second image. When the preview image displayed on the display area of the display unit 151 is a synthesized image of the first and second images, the preview image may be a stereoscopic image generated by the electronic device 100 (FIGS. 4A-5B).

FIG. 20 illustrates an example of displaying a preview image of the stereoscopic image on the display unit 151 of the electronic device 100 (FIGS. 4A-5B). Referring to FIG. 20, the controller 180 (FIG. 1) controls the display unit 151 to display a synthesized image 20 of the first image received from the first camera module 121a (FIGS. 4A and 5A) and the second image received from the second camera module 121b (FIGS. 4A and 5A) as a preview image. For example, the controller 180 (FIG. 1) controls the display unit 151 to display a stereoscopic image generated by the electronic device 100 (FIGS. 4A-5B) so that a user may identify the stereoscopic image.

Referring again to FIG. 19, when a specific object of at least one object included in the preview image is selected while the preview image is displayed on the display unit 151 (FIGS. 4B and 5B) ("YES" at step S403), the controller 180 (FIG. 1) controls the display unit 151 to display a depth of the stereoscopic image based on the selected object (S404). For example, the controller 180 (FIG. 1) controls the parallax between the first and second images used for generating the stereoscopic image based on the depth of the selected object in the stereoscopic image. The parallax between the two images may be controlled by adjusting a convergence point of the two images.

FIG. 21 illustrates an example of selecting a specific object of at least one object in the preview image shown in FIG. 20. Referring to FIG. 21, when an area where a specific object 20a of at least one object of the preview image displayed on the touch screen 151 is touched, the controller 180 (FIG. 1) controls the display unit 151 to display a depth of the stereoscopic image based on the touched object 20a.

For example, the controller 180 (FIG. 1) may control the depth of the stereoscopic image so that the depth of the selected object 20a in the stereoscopic image is set as a reference value, e.g., '0 position'. To adjust the depth of the stereoscopic image so that the depth of the selected object 20a in the stereoscopic image is set to a desired value, the controller 180 (FIG. 1) controls a position where the first image received from the first camera module 121a (FIGS. 4A and 5A) and the second image received from the second camera module 121b (FIGS. 4A and 5A) are synthesized.

Although FIG. 21 has been described in relation to selecting an object serving as a reference to control the depth of a stereoscopic image by a user touching the area where the specific object 20a is displayed, the present invention is not limited thereto. The controller 180 (FIG. 1) may alternatively analyze images received from a plurality of camera modules to extract objects and may select a specific object among the extracted objects to serve as a reference to control the depth of the stereoscopic image. Additionally, the display unit 151 is not limited to being implemented as a touch screen.

Referring again to FIG. 19, when a zoom condition of the first and second camera modules 121a and 121b (FIGS. 4A and 5A) is changed ("YES" at step S405), the controller 180 (FIG. 1) adjusts the depth of the stereoscopic image based on the changed zoom condition (S406). For example, the controller 180 controls the parallax between the first and second images by adjusting the convergence point of the first and second images.

When an optical zoom condition of the first and second camera modules 121a and 121b (FIGS. 4A and 5A) is adjusted by the controller 180 (FIG. 1), the parallax between the first and second camera modules 121 and 121b, e.g., the convergence point between the images, is changed. Accordingly, the controller 180 (FIG. 1) needs to compensate for a change in the convergence point due to a variation in the zoom condition of the first and second camera modules 121a and 121b.

When the zoom condition of the camera modules 121a and 121b (FIGS. 4A and 5A) is adjusted, the controller 180 (FIG. 1) acquires a changed convergence point of the first and second images based on the adjusted zoom condition. The controller 180 (FIG. 1) may compensate for the change in convergence point due to the adjustment in the zoom condition.

For example, in step S404, the controller 180 changes the convergence point of the first and second images so that the adjusted depth of the object in the stereoscopic image, which was set as the reference value, is reset as the reference value. The reference value in the stereoscopic image may be adjusted depending on the change of the in zoom condition. In other words, the reference value may adjust as the zoom condition of the camera modules 121a and 121b (FIGS. 4A and 5A) is changed.

FIG. 22 illustrates an example of automatically adjusting a depth of a stereoscopic image depending on a change in the zoom condition of the camera modules 121a and 121b (FIGS. 4A and 5A). Referring to FIG. 22, a synthesized image of the first and second images is displayed on the display unit 151 as a preview image 20, and a depth of the stereoscopic image is adjusted based on a selection of a specific object 20a of at least one object in the preview image 20.

As an optical zoom condition of the camera modules 121a and 121b (FIGS. 4A and 5A) changes, a convergence point of the first and second images is changed so that the depth of the stereoscopic image is adjusted. Accordingly, the controller 180 (FIG. 1) controls the display unit 151 to re-adjust the depth of the stereoscopic image by changing the convergence point of the first and second images based on the changed zoom condition.

For example, the controller 180 changes the convergence point of the first and second images so that the depth of the object 20a in the stereoscopic image is set as a reference value suitable for the changed zoom condition. The reference value may be adjusted depending on the degree of zoom of the camera modules 121a and 121b.

Conventionally, when an optical zoom condition of the first and second camera modules 121a and 121b (FIGS. 4A and 5A) for obtaining images used for generating a stereoscopic image is changed upon capturing the stereoscopic image, the depth of the stereoscopic image is required to be reset by moving a position where a left image and a right image are synthesized on a per-pixel basis by a user through button manipulation. However, according to the present invention, when the zoom condition is changed, the electronic device 100 (FIGS. 4A-5B) may automatically adjust the depth of the stereoscopic image based on the changed zoom condition.

Figure 23:
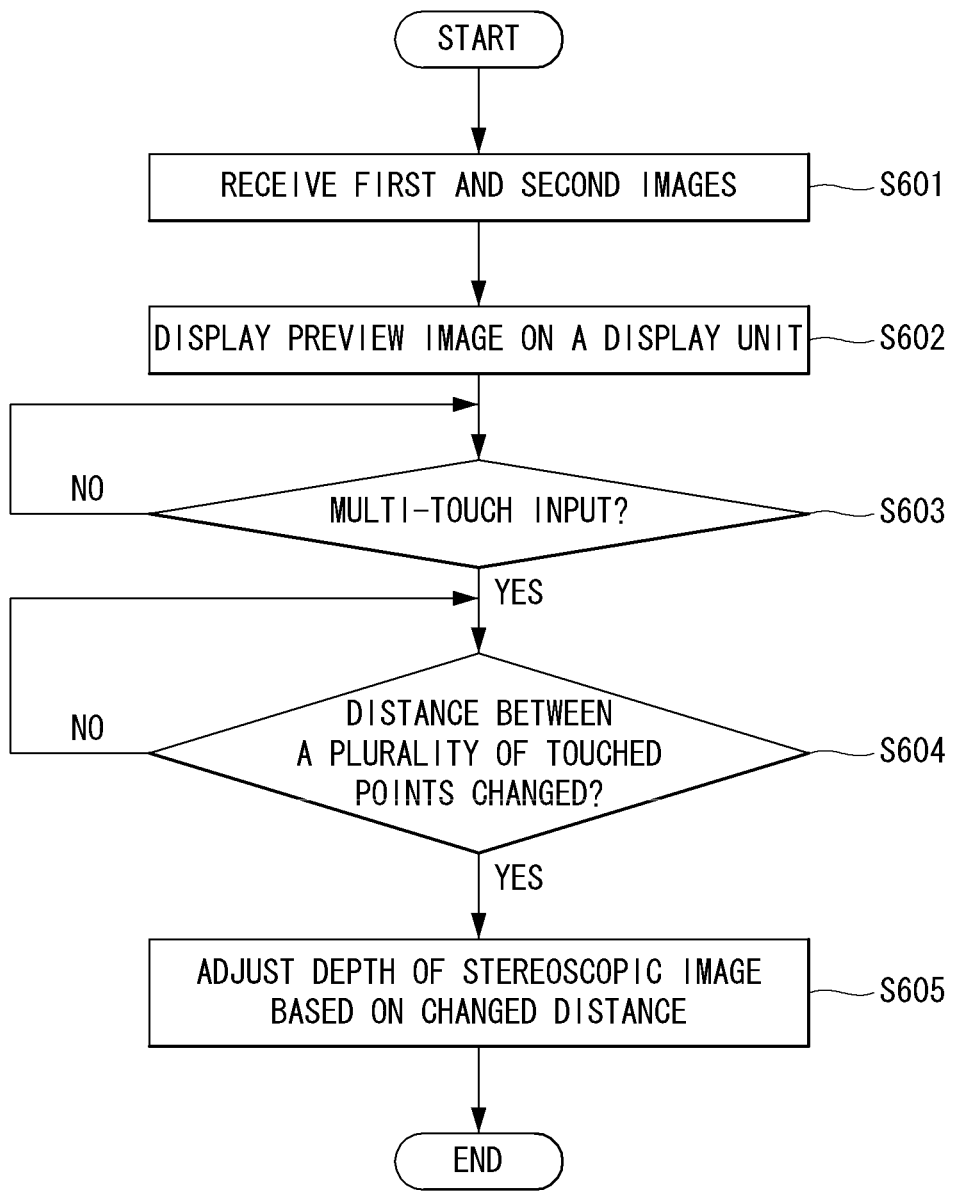
FIG. 23 is a flowchart illustrating a method of controlling an electronic device according to an embodiment of the present invention.
Figure 24:
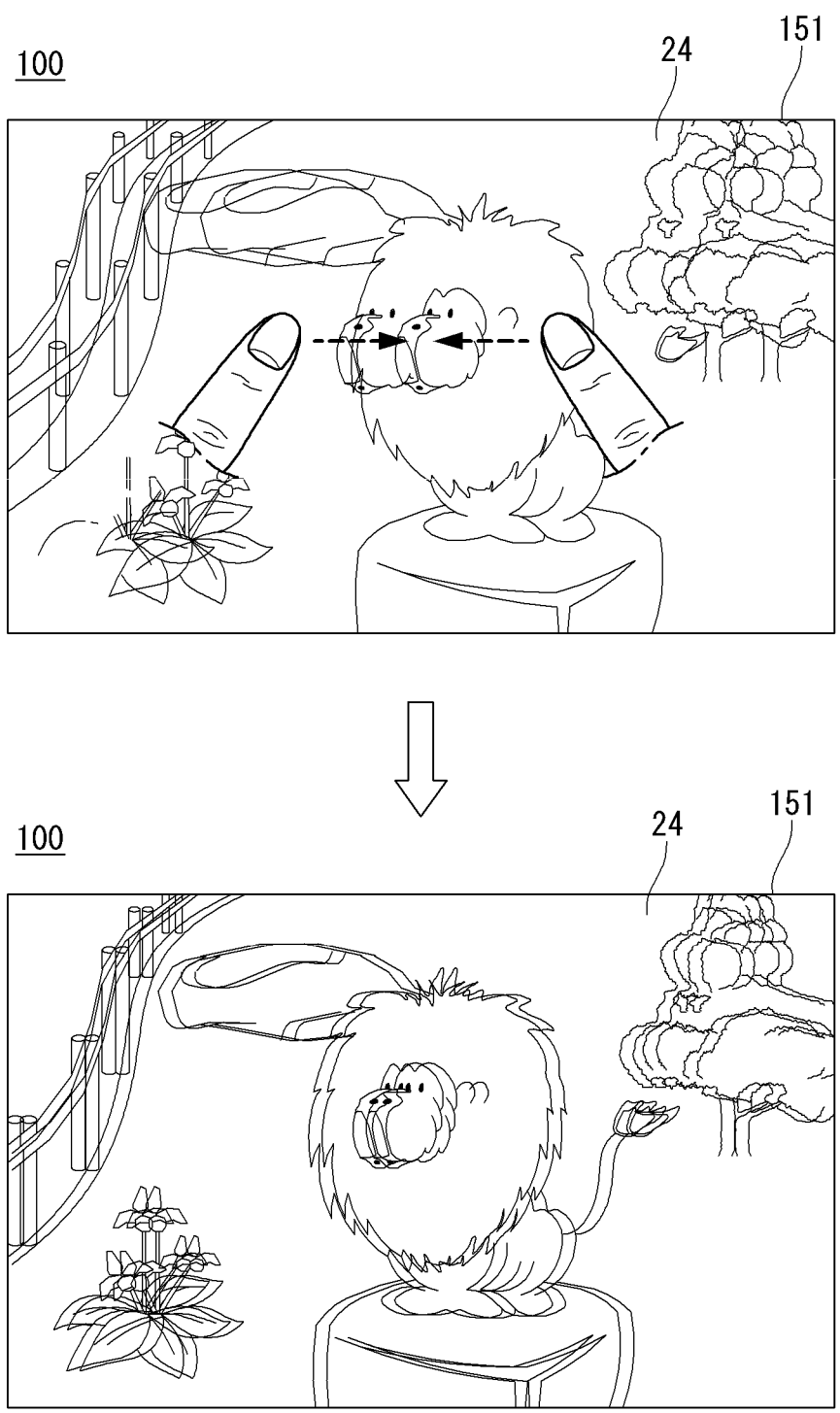
FIG. 24 is a view illustrating an example of adjusting a depth of a stereoscopic image based on a change in distance between a plurality of multi-touched points in an electronic device according to an embodiment of the present invention.

A method of controlling the electronic device 100 (FIGS. 4A-5(*b*)) and an operation of the electronic device 100 according to an embodiment of the present invention will now be described with reference to FIGS. 23 and 24. FIG. 23 is a flowchart illustrating a method of controlling the electronic device 100 according to an embodiment of the present invention. FIG. 24 is a view illustrating a method of controlling the electronic device 100 according to an embodiment of the present invention.

Referring to FIG. 23, the controller 180 (FIG. 1) receives input of a first image corresponding to an image for the left eye and a second image corresponding to an image for the right eye from the plurality of camera modules including at least the first camera module 121a ((FIGS. 4A and 5A) and the second camera module 121b (FIGS. 4A and 5A) (S601). The controller 180 controls the display unit 151 (FIGS. 4B and 5B) to display a preview image using the received first and second images (S602). For example, the controller 180 generates a preview image of a stereoscopic image by synthesizing the first image received from the first camera module 121a and the second image received from the second camera module 121b and displays the preview image on the display unit 151 of the electronic device 100 (FIGS. 4A-5B).

Upon receiving a multi-touch input on a plurality of points on the display unit 151 (FIGS. 4B and 5B) ("YES" at step S603), the controller 180 (FIG. 1) determines whether a distance between the plurality of touched points has changed (S604). For this purpose, the controller 180 may acquire the positions of the plurality of touched points and acquire the distance between the plurality of touched points based on the acquired positions.

The "multi-touch input" refers to a situation where the controller 180 (FIG. 1) receives touch input on at least two points in a display area of the display unit 151. The display unit 151 may be implemented as a touch screen to receive the touch inputs.

The distance between the plurality of touched points may be changed, for example, by a drag input of at least one of the touched points. When the distance between the plurality of touched points changes ("YES" at step S604), the controller 180 (FIG. 1) adjusts the depth of the stereoscopic image based on the changed distance (S605).

For example, the controller 180 may change the convergence point of the first and second images to increase or decrease the depth of the stereoscopic image. As the depth of the stereoscopic image is adjusted, the depth of the preview image displayed on the screen of the electronic device 100 (FIGS. 4A-5B) via the display unit 151 may also be adjusted. Accordingly, a user may intuitively identify the depth of the stereoscopic image that has been adjusted by the multi-touch input.

FIG. 24 illustrates an example of adjusting a depth of a stereoscopic image based on a change in distance between a multi-touched plurality of points in the electronic device 100 (FIGS. 4A-5B) according to an embodiment of the present invention. Referring to FIG. 24, the controller 180 (FIG. 1) controls the display unit 151 to display a stereoscopic image obtained by synthesizing a first image and a second image as a preview image 24.

The controller 180 receives a drag input via the display unit 151 starting from at least one touched point among the multi-touched plurality of points while the display unit 151 is multi-touched. For example, the controller 180 receives a drag input of at least one finger among a plurality of fingers touching a display area of the display unit 151. The controller 180 continuously acquires the positions of the plurality of touched points and calculates a change in distance between the plurality of touched points based on the acquired positions.

The controller 180 adjusts the depth of the stereoscopic image based on the changed distance between the plurality of touched points. For example, the controller 180 changes the convergence point of the first and second images used for generating the stereoscopic image.

According to the embodiment described in connection with FIG. 24, upon adjusting the depth of the stereoscopic image, a user may set the depth of the stereoscopic image to a desired value by merely touching the display area of the display unit 151, such as by a finger, and moving the finger along the display area. Accordingly, user convenience is enhanced in comparison to the conventional method of setting the depth of the stereoscopic image by changing the convergence point on a per-pixel basis via button manipulation by a user.

Figure 25:
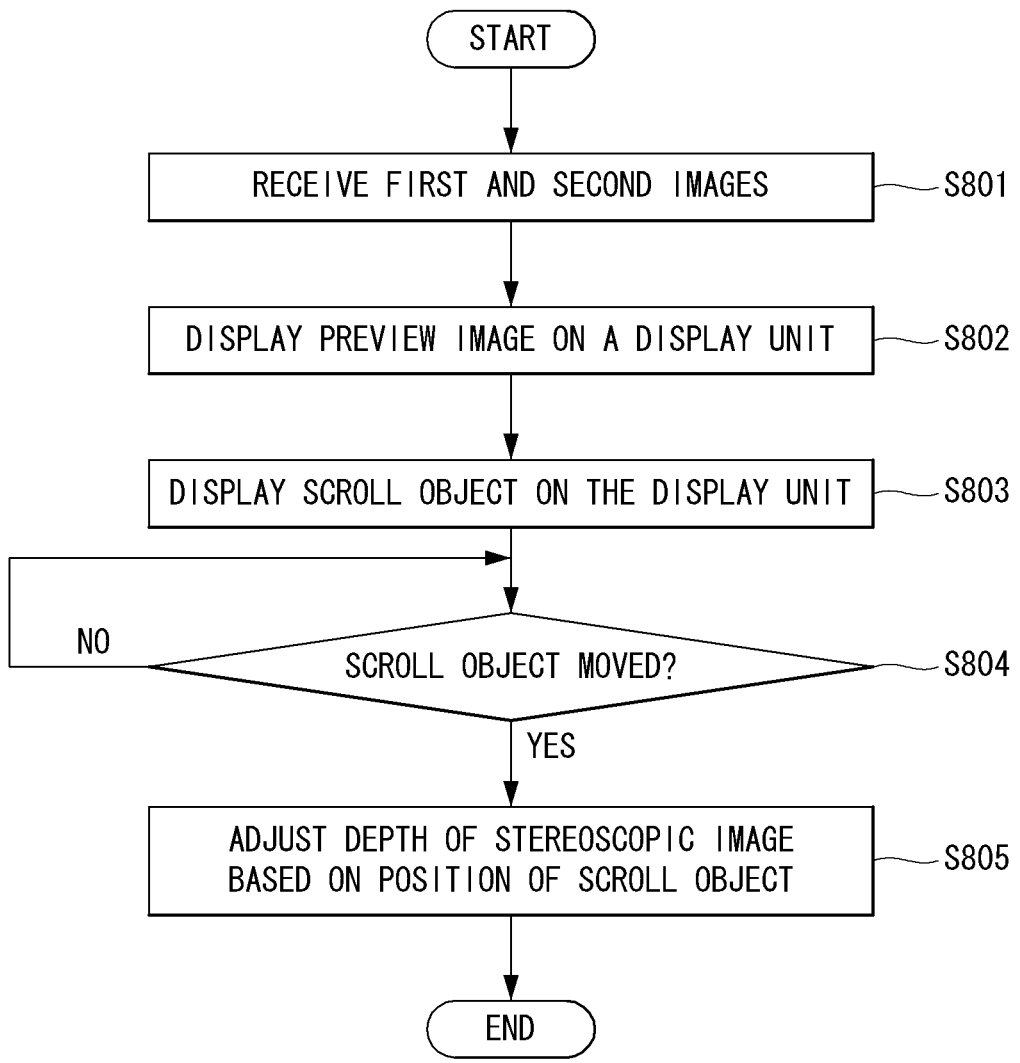
FIG. 25 is a flowchart illustrating a method of controlling an electronic device according to an embodiment of the present invention.

A method of controlling the electronic device 100 (FIGS. 4A-5B) and an operation of the electronic device 100 according to an embodiment of the present invention will now be described with reference to FIGS. 25-28B. FIG. 25 is a flowchart illustrating a method of controlling the electronic device 100 according to an embodiment of the present invention. FIGS. 26 to 28B are views illustrating a method of controlling the electronic device 100 according to an embodiment of the present invention.

Referring to FIG. 25, the controller 180 (FIG. 1) receives input of a first image corresponding to an image for the left eye and a second image corresponding to an image for the right eye from a plurality of camera modules including at least the first camera module 121*a* (FIGS. 4A and 5A) and the second camera module (FIGS. 4A and 5A) (S801). The controller 180 controls the display unit 151 (FIGS. 4B and 5B) to display a preview image on a display area of the display unit 151 using the first and second images (S802).

For example, the controller 180 generates the preview image of a stereoscopic image by overlapping and combining the first image received from the first camera module 121*a* and the second image received from the second camera module 121*b* and controls the display unit 151 to display the preview image of the electronic device 100 (FIGS. 4A-5B). The display unit 151 may be implemented as a touch screen.

The controller 180 (FIG. 1) controls the display unit 151 (FIGS. 4B and 5B) to display a scroll object on the preview image (S803). The controller 180 may control the display unit 151 to display the scroll object automatically when the electronic device 100 (FIGS. 4A-5B) is in a specific state, such as when the preview image is displayed, or only when the scroll object is requested to be displayed via input received via the user input unit 130. The scroll object may include a scroll bar.

Figure 26:
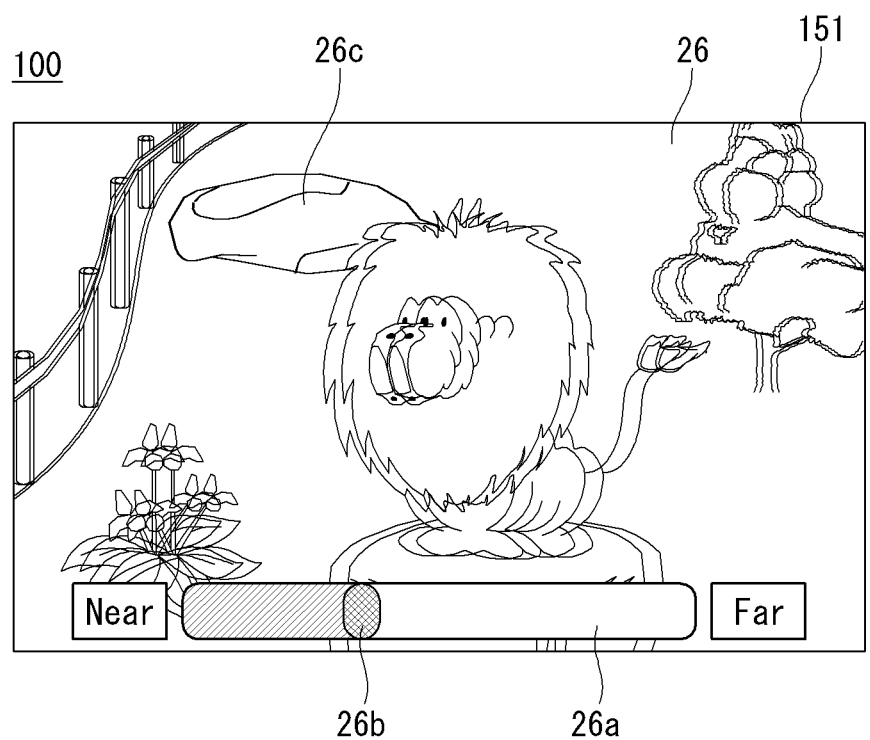
FIG. 26 is a view illustrating an example of displaying a scroll object on the display unit of the electronic device according to an embodiment of the present invention.

FIG. 26 illustrates an example of displaying a scroll object on the touch screen 151. Referring to FIG. 26, the controller 180 (FIG. 1) controls the touch screen 151 to display a synthesized image of a first image and a second image as a preview image 26. The controller 180 (FIG. 1) also controls the touch screen 151 to display a scroll area 26*a* in which the convergence point of the first and second images is changed and a scroll object 26*b* representing a current convergence point of the first and second images.

For example, the scroll area 26*a* representing a variable range of a depth of a stereoscopic image and the scroll object 26*b* representing the current depth of the stereoscopic image are displayed on the touch screen 151. The position of the scroll object may be displayed based on a specific object 26*c*, of at least one object, selected in the preview image.

For example, the controller 180 (FIG. 1) changes the convergence point of the first and second images so that the depth of the specific object 26*c* in the stereoscopic image as selected in the preview image 26 is set as a reference value, for example, '0 position'. The controller 180 (FIG. 1) may control the touch screen 151 to display a degree of the depth of the stereoscopic image adjusted with respect to the depth of the selected object 26*c* in the stereoscopic image that is set as the reference value by using the scroll object 26*b*.

Referring again to FIG. 25, when the position of the scroll object is moved ("YES" at step S804), such as by a drag input on the touch screen 151, the controller 180 adjusts the depth of the stereoscopic image displayed on the touch screen 151 based on the moved position of the scroll object (S805). For example, the controller 180 changes the convergence point of the first and second images to increase or decrease the depth of the stereoscopic image.

As the depth of the stereoscopic image is adjusted, the preview image displayed on the display unit 151 (FIG. 26) of the electronic device 100 (FIGS. 4A-5B) is correspondingly adjusted. Accordingly, a user may intuitively identify the depth of stereoscopic image that was adjusted via the movement of the scroll object.

Figure 27A:
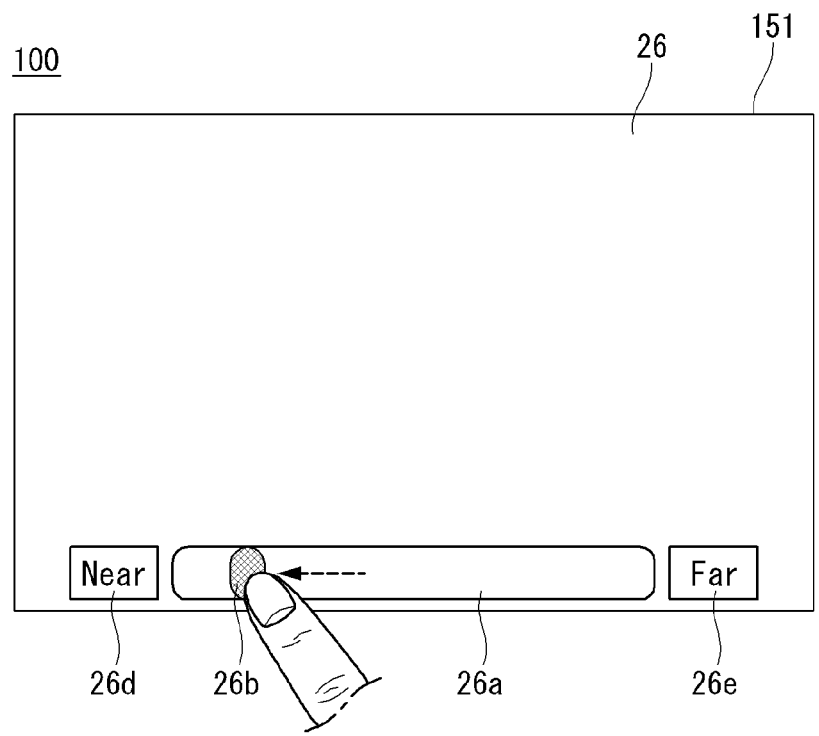
FIGS. 27A-28B are views illustrating examples of adjusting a depth of a stereoscopic image based on a position of a scroll object in an electronic device according to an embodiment of the present invention.
Figure 27B:
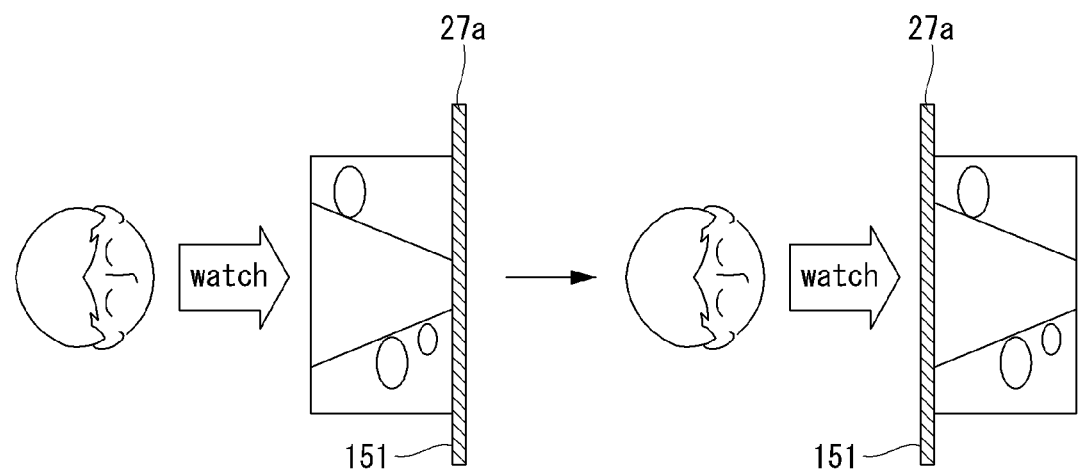
Figure 28A:
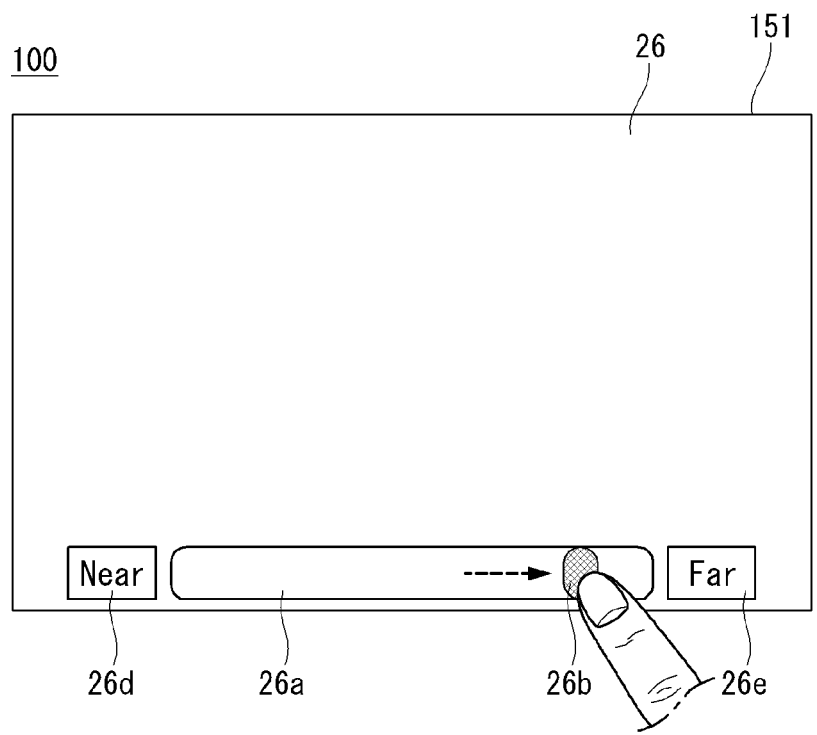
Figure 28B:
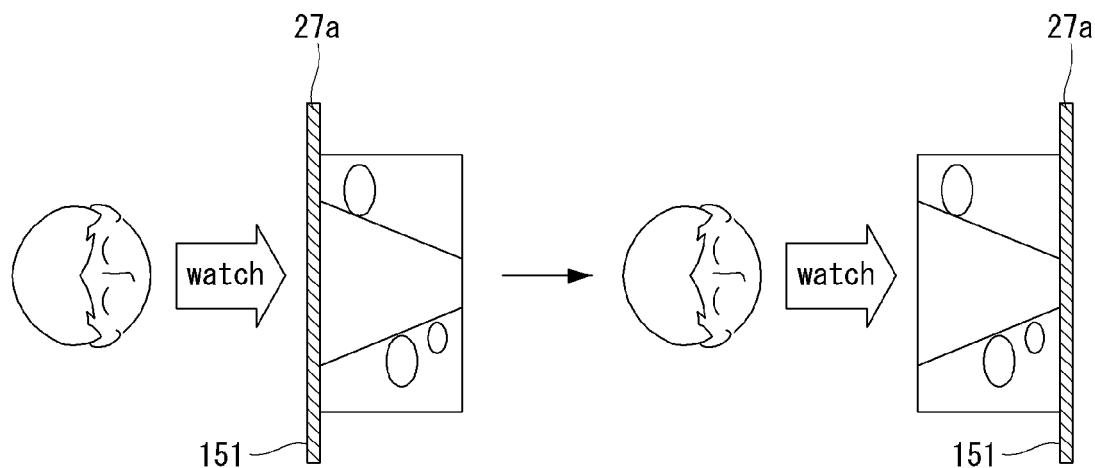

FIGS. 27A-28B illustrate examples of adjusting a depth of a stereoscopic image based on a position of a scroll object. FIG. 27A illustrates a situation where a user scrolls the scroll object 26*b* toward a 'Near' button 26*d*. FIG. 27B illustrates that as the scroll object 26*b* is moved, a 3D effect of a stereoscopic image is changed. FIG. 28A illustrates a situation where a user scrolls the scroll object 26*b* toward a 'Far' button 26*e*. FIG. 28B illustrates that as the scroll object 26*b* is scrolled, a 3D effect of stereoscopic image is changed.

Referring to FIGS. 27A and 27B, as the scroll object 26*b* is moved closer to the 'Near' button 26*d*, the convergence point is moved toward a front side of the display surface 27A of the display unit 151. Further, the depth of stereoscopic image is adjusted to provide a 3D effect of an object in the stereoscopic image being gradually moved back with respect to the display surface 27*a* of the display unit 151 of the electronic device 100 (FIGS. 4A-5B).

Referring to FIGS. 28A and 28B, as the scroll object 26*b* is moved closer to the 'Far' button 26*e*, the convergence point is moved toward a rear side of the display surface 27*a* of the display unit 151. Further, the depth of stereoscopic image is adjusted to provide a 3D effect of an object in the stereoscopic image being gradually projected toward the front with respect to the display surface 27a of the display unit 151 of the electronic device 100 (FIGS. 4A-5B).

According to the embodiment described in connection to FIGS. 25 to 28B, upon adjusting the depth of stereoscopic image, a user may set the depth of the stereoscopic image to a desired value by merely scrolling the scroll bar. Accordingly, user convenience is enhanced in comparison to the conventional method of setting the depth of stereoscopic image by shifting the convergence point on a per-pixel basis by a user through button manipulation.

Figure 29:
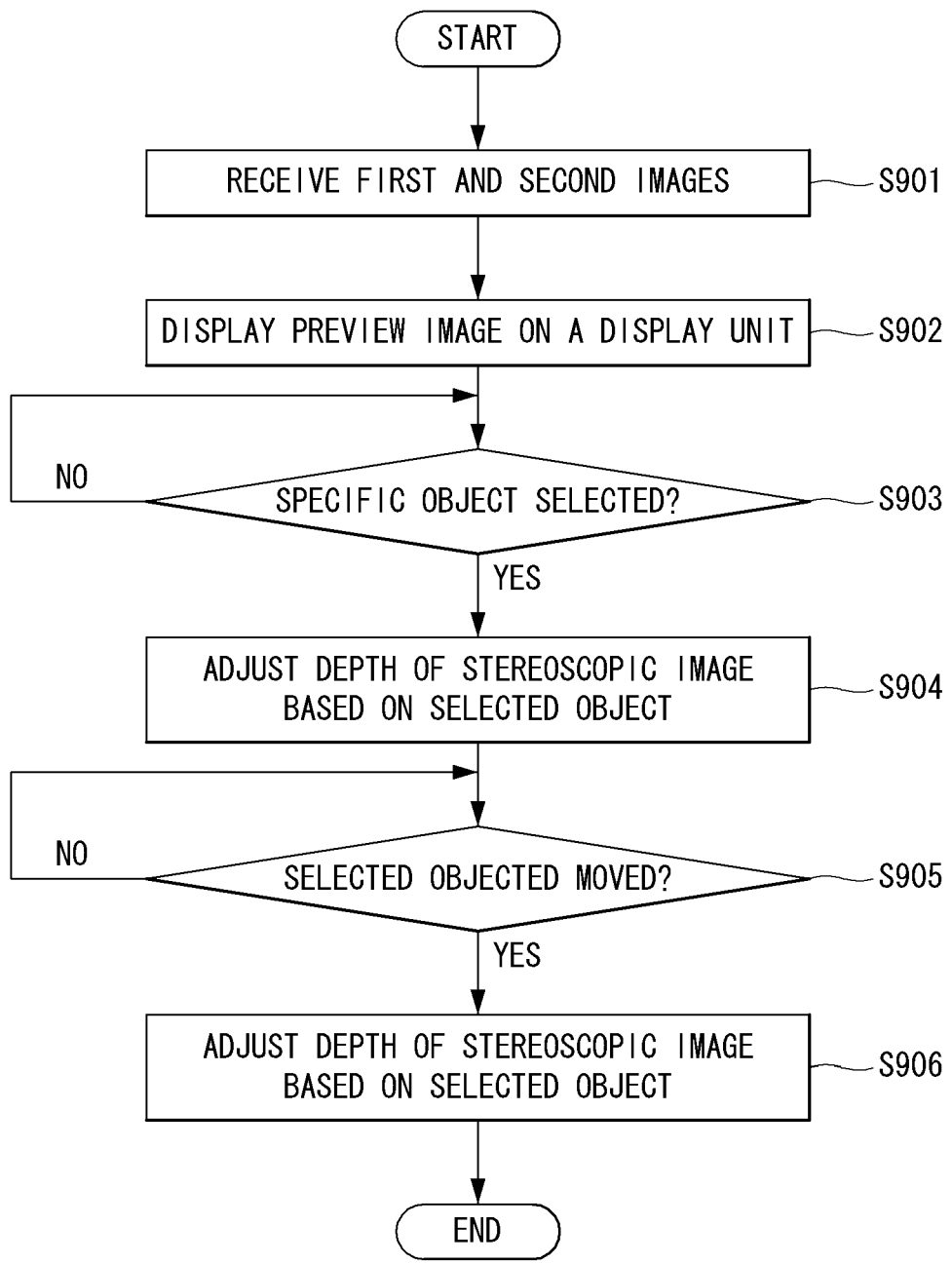
FIG. 29 is a flowchart illustrating a method of controlling an electronic device according to an embodiment of the present invention.
Figure 30:
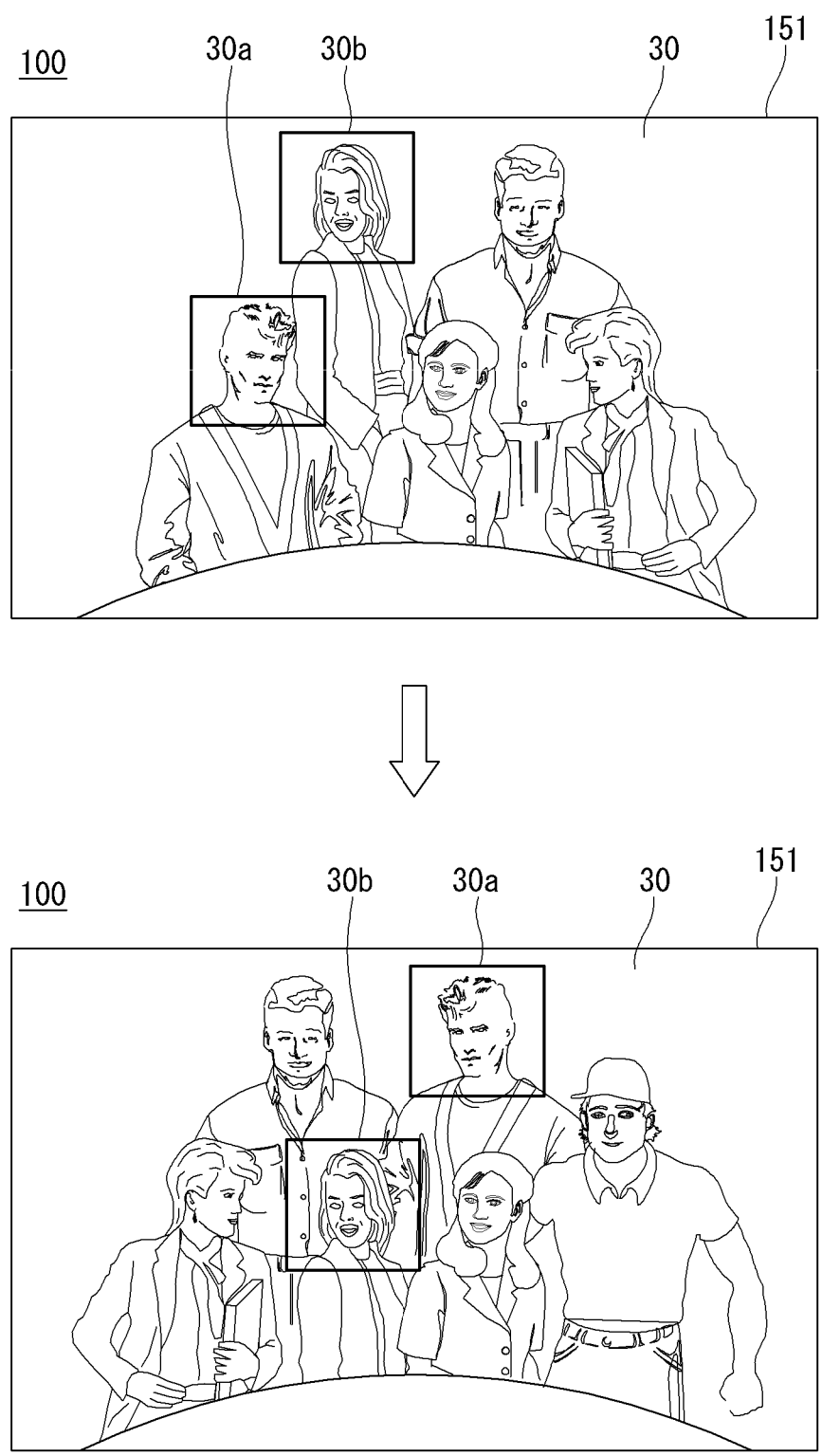
FIG. 30 is a view illustrating an example of adjusting a depth of a stereoscopic image based on a movement of a selected object in an electronic device according to an embodiment of the present invention.

A method of controlling the electronic device 100 (FIGS. 4A-5B) and an operation of the electronic device 100 according to an embodiment of the present invention will now be described in greater detail with reference to FIGS. 29 and 30. FIG. 29 is a flowchart illustrating a method of controlling the electronic device 100 according to an embodiment of the present invention. FIG. 30 is a view illustrating a method of controlling the electronic device 100 according to an embodiment of the present invention.

Referring to FIG. 29, the controller 180 (FIG. 1) receives input of a first image corresponding to an image for the left eye and a second image corresponding to an image for the right eye from the plurality of camera modules including at least the first camera module 121a (FIGS. 4A and 5A) and the second camera module 121b (FIGS. 4A and 5A) (S901). The controller 180 (FIG. 1) acquires a preview image through at least the first camera module 121a or the second camera module 121b and controls the display unit 151 (FIGS. 4B and 5B) to display the acquired preview image (S902).

The preview image may be the first image received from the first camera module 121a or the second image received from the second camera module 121b. Alternatively, the preview image may be a synthesized image obtained by overlapping the first and second images. When the preview image displayed on the display area of the display unit 151 is the synthesized image of the first and second images, the preview image may be a stereoscopic image generated by the electronic device 100 (FIGS. 4A-5B).

When a specific object of at least one object included in the preview image is selected while the preview image is displayed on the display unit 151 (FIGS. 4B and 5B) ("YES" at step S903), the controller 180 (FIG. 1) controls the display unit 151 to adjust a depth of the stereoscopic image based on the selected object (S904).

The method of adjusting the depth of the stereoscopic image based on the selected object is substantially identical to the method of adjusting the depth of the stereoscopic image based on the selected object as described in connection with FIGS. 19 to 22. Accordingly, further detailed description thereof will be omitted.

The controller 180 (FIG. 1) continuously acquires a movement of the selected object via image recognition. When the selected object is moved ("YES" at step S905), the controller 180 controls the display unit 151 (FIGS. 4B and 5B) to adjust the depth of the stereoscopic image based on the selected object as in step S904 (S906). More particularly, the controller 180 (FIG. 1) controls the display unit 151 to adjust the depth of the stereoscopic image and sets the depth of selected object in the stereoscopic image as a reference value.

FIG. 30 illustrates an example of adjusting a depth of a stereoscopic image based on a movement of a selected object. Referring to FIG. 30, a first object 30a of at least one object is selected in a preview image 30. The controller 180 (FIG. 1) controls the display unit 151 to display a depth of a stereoscopic image based on the selected first object 30a.

For example, the controller 180 controls the entire depth of the stereoscopic image so that the depth of the first object 30a in the stereoscopic image is set as a reference value, e.g., '0 position'. In such a circumstance, a 3D effect is created with a second object 30b located behind the first object 30a appearing to be located further back from the '0 position'.

The depth of the first object 30a is adjusted as the first object 30a is moved, such as toward the back of the image. Accordingly, the controller 180 (FIG. 1) resets the depth of the stereoscopic image based on the moved position of the first object 30a. In the example of FIG. 30, a 3D effect is created where the second object 30b appears to be projected further toward the front than the '0 position' since the second object 30b is located in front of the first object 30a.

According to the embodiment described in connection with FIGS. 29 and 30, when an object selected as a reference is moved, the electronic device 100 (FIGS. 4A-5B) may automatically adjust the depth of the stereoscopic image based on the movement of the selected object. Accordingly, a user need not reset the depth of the stereoscopic image through button manipulation corresponding to the movement of the object.

The method of controlling the electronic device described herein may be written as computer programs and may be implemented in digital microprocessors that execute the programs using a computer readable recording medium. The method of controlling the electronic device may be executed through software. The software may include code segments that perform required tasks. Programs or code segments may also be stored in a processor readable medium or may be transmitted according to a computer data signal combined with a carrier through a transmission medium or communication network.

The computer readable recording medium may be any data storage device that can store data that can be read by a computer system. Examples of the computer readable recording medium include read-only memory (ROM), random-access memory (RAM), CD-ROMs, DVD-ROM, DVD-RAM, magnetic tapes, floppy disks, and optical data storage devices. The computer readable recording medium may also be distributed over network coupled computer systems so that the computer readable code is stored and executed via distribution.

The foregoing embodiments and advantages are merely exemplary and are not to be construed as limiting the present invention. The present teaching can be readily applied to other types of apparatuses. The description of the foregoing embodiments is intended to be illustrative, and not to limit the scope of the claims. Many alternatives, modifications, and variations will be apparent to those skilled in the art.

What is claimed is:

1. An electronic device, comprising:
    a display unit configured to display images and comprising a touch screen;
    at least a first camera module and a second camera module, wherein each of the first camera module and the second camera module is configured to acquire an image; and
    a controller configured to:
        synthesize a first image acquired from the first camera module and a second image acquired from the second camera module to generate a stereoscopic image;
        obtain a distance between the electronic device and at least one object included in the stereoscopic image;

control the display unit to:
  display a preview image of the stereoscopic image in an entire area of the display unit when the obtained distance is greater than a predetermined distance; and
  display a preview image of the stereoscopic image in a first display area of the display unit and display a preview image of the first image or the second image in a second display area of the display unit when the obtained distance is less than or equal to the predetermined distance;
receive, via the touch screen, a touch input selecting an object at a first position in the preview image of the first image, the second image, or the stereoscopic image;
adjust a depth of the selected object to a reference depth by controlling a depth of an entire area of the stereoscopic image;
control the display unit to display the preview image of the stereoscopic image reflecting the controlled depth;
detect a change of the depth of the selected object according to a movement of the selected object from the first position to a second position in the preview image of the stereoscopic image;
restore the changed depth of the selected object to the reference depth by re-controlling the depth of the entire area of the stereoscopic image; and
control the display unit to display the preview image of the stereoscopic image reflecting the re-controlled depth.

2. The electronic device of claim 1, wherein the controller is further configured to control the depth of the stereoscopic image by adjusting a convergence point of the first image and the second image.

3. The electronic device of claim 1, wherein:
the controller is further configured to receive the selection of the object based on a position of the touch input received via the touch screen.

4. The electronic device of claim 1, wherein:
the first image and the second image include at least one object;
each of the at least one object of the first image and the second image corresponds to one of at least one object of the stereoscopic image; and
the controller is further configured to control the display unit to display a position of the at least one object of the stereoscopic image corresponding to the selected object of the preview image of the first image or the second image.

5. The electronic device of claim 1, wherein the controller is further configured to control the display unit to display an area included in the stereoscopic image in each of the preview image of the first image and the second image.

6. The electronic device of claim 1, wherein:
the controller is further configured to control the display unit to display the preview image of the stereoscopic image in the second display area of the display unit and to display the preview image of the first image or the second image in the first display area of the display unit based on a drag input from the second display area to the first display area.

7. The electronic device of claim 1, wherein
the controller is further configured to:
detect a change of the depth of the selected object when a zoom condition of the first and second camera modules is changed;
restore the depth of the specific object changed according to the changed zoom condition to the reference depth by controlling the depth of the entire area of the stereoscopic image; and
control the display unit to display the preview image of the stereoscopic image reflecting the controlled depth.

8. The electronic device of claim 7, wherein the zoom condition is an optical zoom condition of the first and second camera modules.

9. The electronic device of claim 1, wherein
the controller is further configured to:
adjust a depth of the stereoscopic image based on a change in a distance between a plurality of positions of touch inputs received via the touch screen such that the preview image of the stereoscopic image is displayed reflecting the depth adjusted based on the change in the distance.

10. A method of controlling an electronic device including a plurality of camera modules, the method comprising:
synthesizing, via a controller, a first image acquired from a first of the plurality of camera modules and a second image acquired from a second of the plurality of camera modules to generate a stereoscopic image;
obtaining a distance between the electronic device and at least one object included in the stereoscopic image;
controlling a display unit, via the controller, to display a preview image of the stereoscopic image in an entire area of the display unit when the obtained distance is greater than a predetermined distance; and to display a preview image of the stereoscopic image in a first display area of the display unit and display a preview image of the first image or the second image in a second display area of the display unit when the distance is less than or equal to the predetermined distance;
receiving, via a touch screen, a touch input selecting an object at a first position in the preview image of the first image, the second image, or the stereoscopic image;
adjusting a depth of the selected object to a reference depth by controlling a depth of an entire area of the stereoscopic image;
controlling the display unit, via the controller, to display the preview image of the stereoscopic image reflecting the controlled depth;
detecting a change of the depth of the selected object according to a movement of the selected object from the first position to a second position in the preview image of the stereoscopic image;
restoring the changed depth of the selected object to the reference depth by re-controlling the depth of the entire area of the stereoscopic image; and
controlling the display unit, via the controller, to display the preview image of the stereoscopic image reflecting the re-controlled depth.

* * * * *